United States Patent
Wu et al.

(10) Patent No.: US 12,099,436 B2
(45) Date of Patent: Sep. 24, 2024

(54) APPLICATION PERFORMANCE MONITORING FOR MONOLITHIC APPLICATIONS AND DISTRIBUTED SYSTEMS

(71) Applicant: Oracle International Corporation, Redwood Shores, CA (US)

(72) Inventors: Fuheng Wu, Fremont, CA (US); Ivan Dimitrov Davchev, Austin, TX (US); Jun Qian, Bellevue, WA (US)

(73) Assignee: Oracle International Corporation, Redwood Shores, CA (US)

( * ) Notice: Subject to any disclaimer, the term of this patent is extended or adjusted under 35 U.S.C. 154(b) by 112 days.

(21) Appl. No.: 18/157,750

(22) Filed: Jan. 20, 2023

(65) Prior Publication Data
US 2023/0236955 A1      Jul. 27, 2023

Related U.S. Application Data

(60) Provisional application No. 63/301,857, filed on Jan. 21, 2022.

(51) Int. Cl.
| | |
|---|---|
| *G06F 11/36* | (2006.01) |
| *G06F 8/30* | (2018.01) |
| *G06F 9/46* | (2006.01) |
| *G06F 9/54* | (2006.01) |
| *G06F 16/23* | (2019.01) |

(52) U.S. Cl.
CPC ...... *G06F 11/3664* (2013.01); *G06F 11/3612* (2013.01)

(58) Field of Classification Search
CPC ............ G06F 11/3664; G06F 11/3612; G06F 16/353; G06F 11/0766; G06F 11/00; G06F 16/84; G06F 9/44505; G06F 11/3006; G06F 11/3086; G06F 9/542; G06F 3/04842; G06F 11/3072; G06F 11/0775; G06F 16/2455
See application file for complete search history.

(56) References Cited

U.S. PATENT DOCUMENTS

2002/0166115 A1* 11/2002 Sastry ..................... G06F 8/441
                                                           717/151

* cited by examiner

*Primary Examiner* — Thuy Dao
(74) *Attorney, Agent, or Firm* — Kilpatrick Townsend & Stockton LLP

(57) ABSTRACT

A computing device may access a target code for implementing an application. The device may identify addresses for one or more functions or one or more variables associated with the target code. The device may generate an interval tree comprising a root node and one or more function nodes. The device may in response to the target code invoking a function or variable: generate an intercept function configured to intercept communication between the target code and a call address for the at least one of the one or more functions or the one or more variables invoked by the target code. The device may intercept data communicated between the target code and the call address. The device may store the intercepted data as a function node in the interval tree. The device may transmit the interval tree to a user device.

20 Claims, 16 Drawing Sheets

APPLICATION PERFORMANCE MONITORING FOR MONOLITHIC APPLICATIONS AND DISTRIBUTED SYSTEMS

CROSS-REFERENCE TO RELATED APPLICATIONS

The present application is a Non-Provisional of U.S. Provisional Application No. 63/301,857, filed Jan. 21, 2022, entitled "APPLICATION PERFORMANCE MONITORING FOR MONOLITHIC APPLICATIONS AND DISTRIBUTED SYSTEMS", the entire contents of which is incorporated by reference as if fully set forth herein, under 35 U.S.C. § 120.

BACKGROUND OF THE INVENTION

Application performance monitoring tools can suffer from a number of limitations. Offline application performance monitoring tools can have low timing accuracy and high performance overhead. Online application performance monitoring tools using explicit instrumentation or an agent thread can be error prone and intrusive. Additionally, application performance monitoring tools may not be able to monitor both monolithic applications and distributed systems. Accordingly, challenges exist in application performance monitoring.

BRIEF SUMMARY OF THE INVENTION

In some aspects, a method includes: accessing a target code for implementing an application using a computing device. The method can include identifying a plurality of respective addresses for one or more functions or one or more variables associated with the target code using the computing device. An interval tree comprising a root node and one or more function nodes can be generated by the computing device. The root node and one or more function nodes can correspond to at least one of a function or one or more variables. In response to the target code invoking at least one of the one or more functions or the one or more variables: an intercept function can be generated by the computing device. The intercept function can be configured to intercept communication between the target code and a call address. The call address can be a particular address for the at least one of the one or more functions or the one or more variables invoked by the target code. Data communicated between the target code and the call address can be intercepted by the computing device. The intercepted data can be stored by the computing device as a function node in the interval tree. The interval tree can be transmitted to a user device by the computing device.

In some aspects, the intercepted data comprises program runtime information.

In some aspects, the application is either a monolithic application or a distributed system application.

In some aspects, the interval tree further comprises one or more service nodes, a service node corresponding to a service in the distributed system.

In some aspects, the interval tree further comprises one or more subtrees, a subtree comprising a service node and one or more function nodes.

In some aspects, the intercept function is defined by a user at the user device.

In some aspects, the target code is a Python code.

In some aspects, a non-transitory computer-readable medium storing a set of instructions includes: one or more instructions that, when executed by one or more processors of a computing device, cause the computing device to: access a target code for implementing an application. The instructions can cause the computing device to identify a plurality of respective addresses for one or more functions associated with the target code or one or more variables associated with the target code. The computing device can generate an interval tree comprising a root node and one or more function nodes corresponding to at least one of a function or one or more variables. In response to the target code invoking at least one of the one or more functions or the one or more variables the computing device can: generate an intercept function. The intercept function can be configured to intercept communication between the target code and a call address. The call address can be a particular address for the at least one of the one or more functions or the one or more variables invoked by the target code. The computing device can intercept data communicated between the target code and the call address. The computing device can store the intercepted data as a function node in the interval tree; and transmit the interval tree to a user device.

In some aspects, a computing device includes: one or more memories; and one or more processors, communicatively coupled to the one or more memories, configured to: access a target code for implementing an application. The computing device can identify a plurality of respective addresses for one or more functions associated with the target code or one or more variables associated with the target code. The computing device can generate an interval tree comprising a root node and one or more function nodes corresponding to at least one of a function or one or more variables. In response to the target code invoking at least one of the one or more functions or the one or more variables the computing device can: generate an intercept function. The intercept function can be configured to intercept communication between the target code and a call address. The call address can be a particular address, of the plurality of respective addresses, for the at least one of the one or more functions or the one or more variables invoked by the target code. The computing device can intercept data communicated between the target code and the call address. The computing device can store the intercepted data as a function node in the interval tree and transmit the interval tree to a user device.

DETAILED DESCRIPTION OF THE INVENTION

Figure 1B:
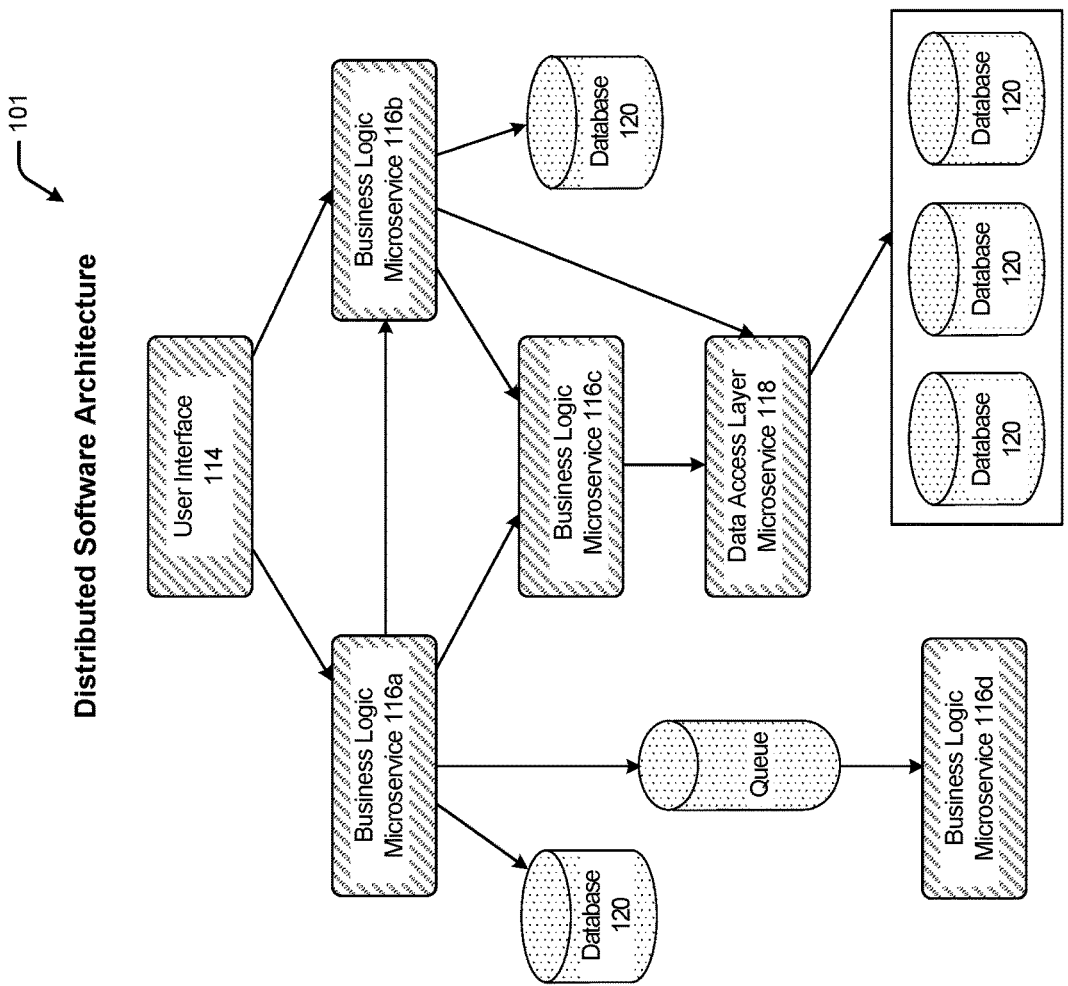
FIG. 1B is a simplified diagram of a distributed software architecture according to an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure provide techniques for application performance monitoring (APM) for dynamic coding languages. Dynamic coding languages, including Python, Perl, Ruby, etc., can be coding languages that allow run-time modifications. Application performance monitoring can include measuring a computer program's response time or the computational resources used by the program. Optimizing computer programs, including both monolithic applications and distributed systems, can be facilitated with application performance monitoring.

APM can be performed by a monitoring tool that can identify a program's performance bottlenecks. A bottleneck can be a rate limiting component that is not able to keep pace with the rest of the program or a component that consumes a disproportionate amount of resources. A program's performance can be optimized by identifying bottlenecks and reducing the component's execution time or resource consumption. A monitoring tool can identify a performance bottleneck by collecting runtime information such as latency, memory, input/output (I/O) data, etc. If the runtime information shows that a component is consuming a disproportionate amount of resources, or executing slowly, that component may be a bottleneck that is causing the program to perform suboptimally.

APM can occur for online and offline programs. Offline programs can be software that runs for a relatively short duration and exits (e.g., it goes offline), such as some database management services, and application performance data for an offline program can be collected through offline performance monitoring. Offline APM of Python code can be performed with built-in libraries such as cProfile, profile, trace, etc. These built in libraries can be useful for development purposes, but the libraries can suffer from a number of drawbacks. The libraries can provide poor timing accuracy, are difficult to customize, have high overhead, and the libraries can provide a large amount of irrelevant information. Additionally, different approaches can be needed for online performance monitoring.

Online programs can be software that is intended to run indefinitely, such as a web service, and APM data for online programs can be collected through online APM. One approach to online APM is explicit instrumentation. Explicit instrumentation can include adding code to a system. The added code can be used to expose the system's inner state for monitoring. For example, a simple program can include a pool of connections to another service. In order to track the size of the pool or the number of unused connections, code can be added to the connection pool logic. Additionally, the code can track when connections are formed, when the connections are destroyed, when the connections are handed out, or when the connections are returned. While explicit instrumentation is a popular APM technique, explicit instrumentation can be error prone and invasive because the monitored program's code is altered by the added code.

An alternate approach to online APM is to use an agent thread to retrieve information from the monitored program's original source code. In addition to the main thread running the program, an agent thread can be created to monitor the main thread. The agent thread can periodically collect and store snapshots of APM data from the monitored program and the collected APM data can be consolidated and reconstructed for users to query. While the agent thread can avoid altering the monitored program's code, the periodic snapshots can create blind spots for the APM system, and an agent may miss events with a duration that is less than the agent's sampling rate. For instance, if the agent creates a snapshot every 15 milliseconds, an event with a 10 millisecond duration may be created and completed between snapshots.

APM with an agent thread can be computationally demanding. Performing snapshots with an agent can mean at least one more running thread and additional network input/output to collect and store the data. For Python programs, the overhead can reach as high as 50% at 4 millisecond snapshot intervals because of Python's global interpreter lock. The global interpreter lock protects access to Python object and can prevent multiple threads from executing Python bytecodes simultaneously.

In an illustrative example, a developer wishes to optimize her software and she would like to track APM data including her program's latency, memory and input/output. By tracking her program's metrics, the developer can identify bottlenecks in her program that can be optimized. The program is a distributed software architecture with a user interface, a business logic microservice, and a data access layer microservice. The developer uses an APM system to collect the APM data from her program's code, known as the target code, using driver code intercept functions containing the tracking logic. The driver code imports the target code and invokes the target code's functions, and the APM system collects APM data for the invoked function. The APM system generates interval trees and provides the interval trees, called APM trees, to the developer. The developer can use the information in the APM trees to optimize her code by identifying and addressing performance bottlenecks.

Figure 1A:
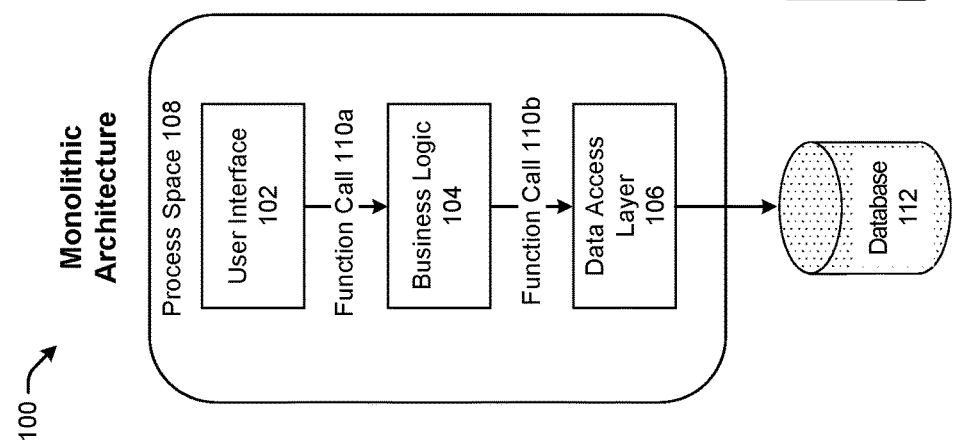
FIG. 1A is a simplified diagram of a monolithic software application according to an embodiment.

FIG. 1A is a simplified diagram of a monolithic software application 100 according to an embodiment. A monolithic software application can be a self-contained program where all functions can be managed and served on a single platform. In a monolithic software application, the user interface 102, business logic 104, data access layer 106 can be contained in a single process space 108. Process space 108 (e.g., virtual address space (VAS), process address space, address space, etc.) can be a range of addresses that are available to a process. User interface 102 can allow a user to provide input to the software. User interface 102 can send a function call 110*a* to business logic 104. Business logic 104 can encode rules that determine how data is shown, stored, created, and altered. Business logic 104 can make a function call 110*b* to the data access layer 106. Data access layer 106 can manage access to the storage associated with the monolithic software application. Data access layer can send and retrieve data from database 112.

FIG. 1B is a simplified diagram of a distributed software architecture 101 according to an embodiment. In a distributed software architecture, or microservice architecture, the software can be divided into limited (e.g., single) purpose modules. The interactions between modules in a distributed software architecture can be provided by an application programming interface (API). The distributed software architecture can include a user interface 114 that is similar to user interface 102. The distributed software architecture can include one or more microservices, such as business logic microservice 116*a*, business logic microservice 116*b*, business logic microservice 116*c*, or business logic microservice 116*d*, that determine how data is shown, stored, created, and altered. The distributed software architecture can include one or more data access layer microservices, such as data access layer microservice 118, that can manage access to the storage associated with the distributed software application. For example, the storage associated with the distributed software architecture can include one or more databases (e.g., database 120).

Figure 2:
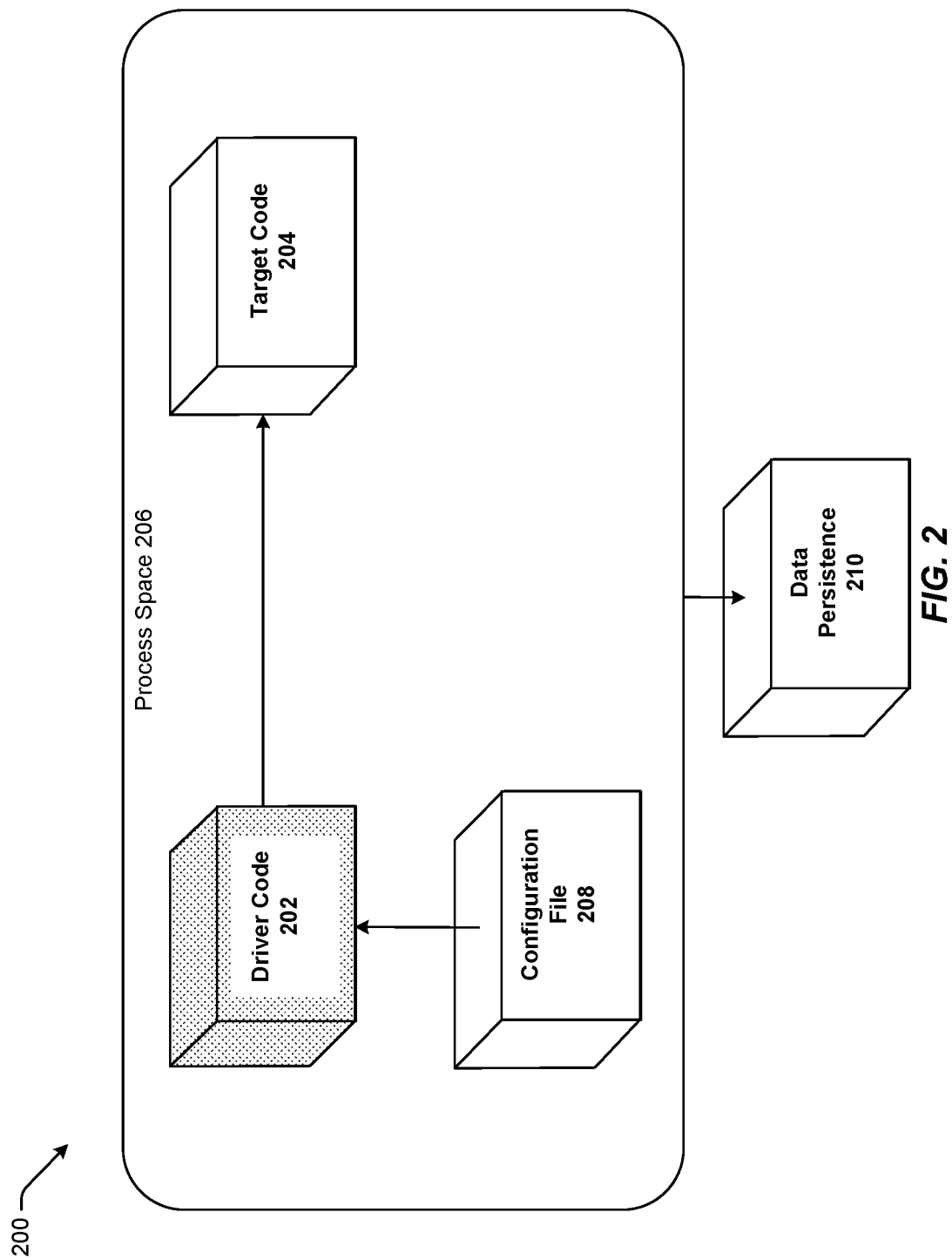
FIG. 2 is a simplified diagram of an application performance monitoring (APM) system according to an embodiment.

FIG. 2 is a simplified diagram of an application performance monitoring (APM) system 200 according to an embodiment. Driver code 202 can be used to collect information from a target code 204. Driver code 202 can execute in a process space 206. Process space 206 (e.g., virtual address space (VAS), process address space, address space, etc.) can be a range of addresses that are available to a process. The APM system can be used to collect information about target code 204. Target code 204 can be runnable code or a module (e.g., runnable python code or a python module, plain text code, binary-format module code, etc.).

Driver code 202 can be executable code that collects information about the target code. Driver code 202 can be similar to an agent, but driver code 202 can collect information from executable code or one or more modules, and, for example, the information can be collected from target code 204. For instance, driver code 202 can be used to call one or more target functions in a target module and driver code 202 can collect APM data from the target functions with one or more intercept functions. The intercept function can collect the data by calling a target function or a target module and collecting data on the called function or module.

Driver code 202 can load a configuration from configuration file 208. In some circumstances, the functions that the driver code can trace can be declared in configuration file 208. In other circumstances, the functions can be declared in driver code 202 without configuration file 208. The configuration can specify one or more intercept functions. APM data obtained from target code 204 by driver code 202 can be sent to data persistence 210. Data persistence 210 can be a destination where the tracing information can be sent. Data persistence 210 can be one or more computing devices that stores data. The data can be stored as a standard output, a log file, a file in a remote messaging system such as Kafka, a file in a remote analytics system, etc.

Figure 3:
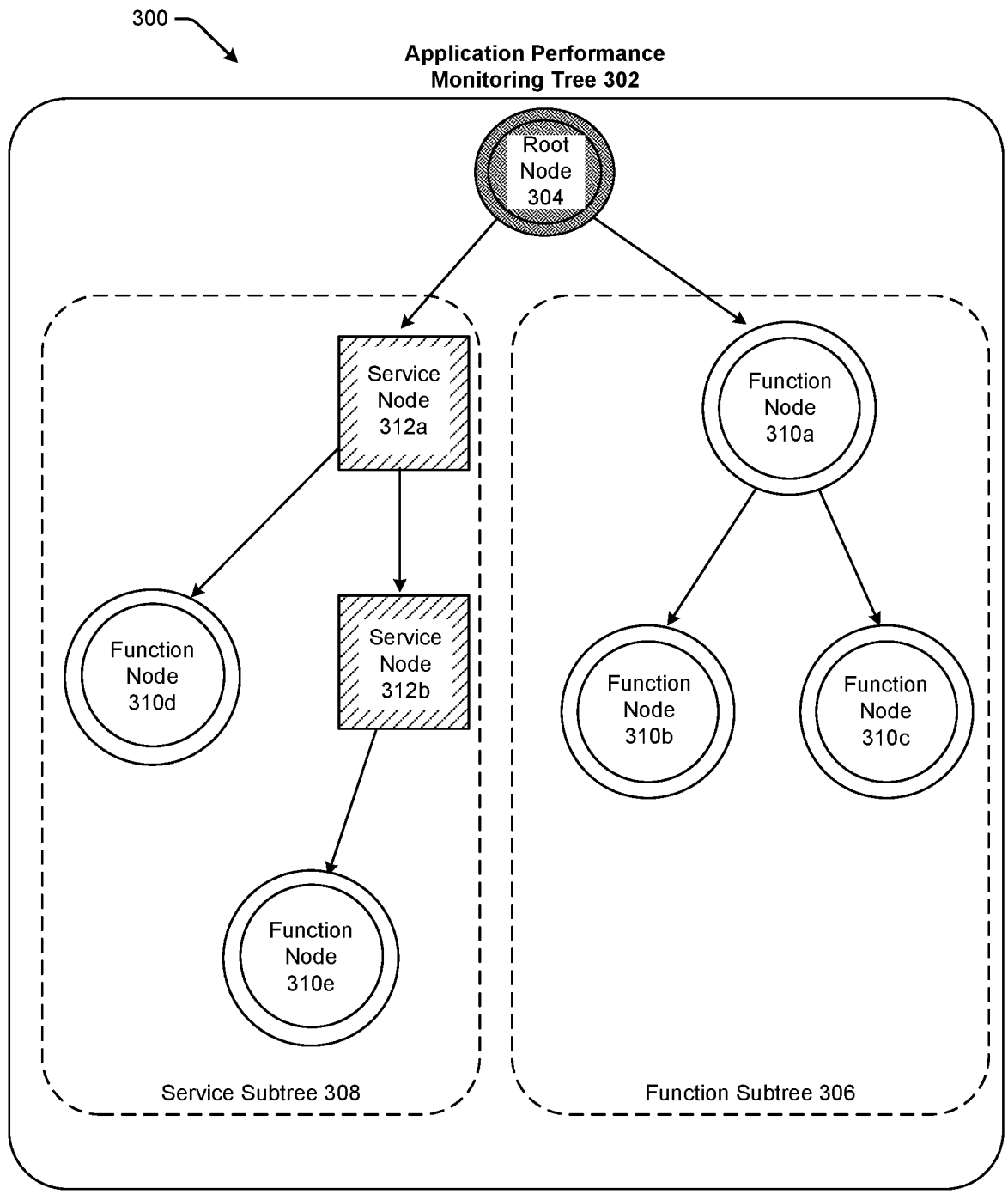
FIG. 3 shows a simplified diagram of an application performance monitoring (APM) tree according to an embodiment.

FIG. 3 shows a simplified diagram of an application performance monitoring (APM) tree 300 according to an embodiment. The APM tree 302 can be a special type of interval tree data structure that is designed for APM tracking and root-cause finding. Root-cause finding, or root-cause analysis, can be the process of finding the origin of a problem so that a solution can be identified. An interval tree can be a tree data structure containing intervals that can be used to find intervals that overlap a given point or interval.

APM tree 302 can combine the features of a call-graph and a trace tree. For monolithic software applications, APM tree 302 can be similar to a call-graph. A call-graph can be a type of control-flow graph showing relationships between a computer program's subroutines. For distributed software architectures (e.g., distributed software architecture 101), APM tree 302 can be similar to the trace tree disclosed in Google's Dapper paper. Sigelman, Benjamin H., et al. "Dapper, a large-scale distributed systems tracing infrastructure." (2010).

APM tree 302 can include at least one of a root node, one or more function nodes 310*a-e*, or one or more service nodes such as service node 312*a* or service node 312*b*. A root node, such as root node 304, can be the topmost node in APM tree 302 and other nodes in the tree can be connected to the root node. APM tree 302 can contain function subtrees 306 and service subtrees 308. If APM tree 302 represents a monolithic application, APM tree 302 may only contain function nodes (e.g., function node 310*a* function node 310*b*, function node 310*c*, function node 310*d* or function node 310*e*). Service nodes, such as service node 312*a* or service node 312*b*, can represent microservices such as user interface 114, business logic microservice 116*a*. business logic microservice 116*b*, business logic microservice 116*c*, business logic microservice 116*d*, or data access layer microservice 118 from FIG. 1B. Function subtree 306 can contain one or more function nodes (e.g., function node 310*a* function node 310*b*, function node 310*c*, function node 310*d* or function node 310*e*) or one or more service nodes (e.g., service node 312*a* or service node 312*b*). Function nodes 310*a-e* can be nodes that represent a function in the target code. Service subtrees 308 can contain at least one of one or more service nodes 312*a-b* and one or more function nodes 310*a-e*.

Nodes in APM tree 302 can be either parent nodes or child nodes. A parent node can be a node that is one hierarchical level above the child node. For example, function nodes 310*b-c* can be the child nodes of the parent function node 310*a*. Function nodes 310*d-e* can be child nodes of parent service nodes 312*a-b*. Function nodes 310*a-e* and service nodes 312*a-b* can be either parent nodes or child nodes. A child node can represent a function or service that is called by the parent node's function or service.

Some or all of the services or functions represented by the nodes in APM tree 302 can be traced. In some circumstances, a configuration file (e.g., configuration file 208) can control which nodes should be traced and which nodes should be ignored. The configuration file can be stored in shared memory. Runtime information can be used to determine which nodes are traced or ignored. The runtime information can include the amount of time the process represented by the node takes to execute, the amount of storage the process consumes, etc. For example, function nodes with a span that is less than 100 milliseconds might be ignored. Ignoring certain nodes can help to reduce the overhead for APM tree 302.

The subtrees for APM tree 302 can be constructed at different times or in different locations. For instance, service subtree 308 can be sent to a server associated with APM tree 302 and reconstructed after tracing. Function subtree 306 can be built in memory at runtime when the related function calls are finished. APM tree 302 can be built or re-constructed so that business logic and tracing logic are separated. Target code (e.g., target code 204) can contain the business logic, and the configuration file (e.g., configuration file 208) or driver code (e.g., driver code 202) can contain the tracing logic.

Figures 4A, 4B:
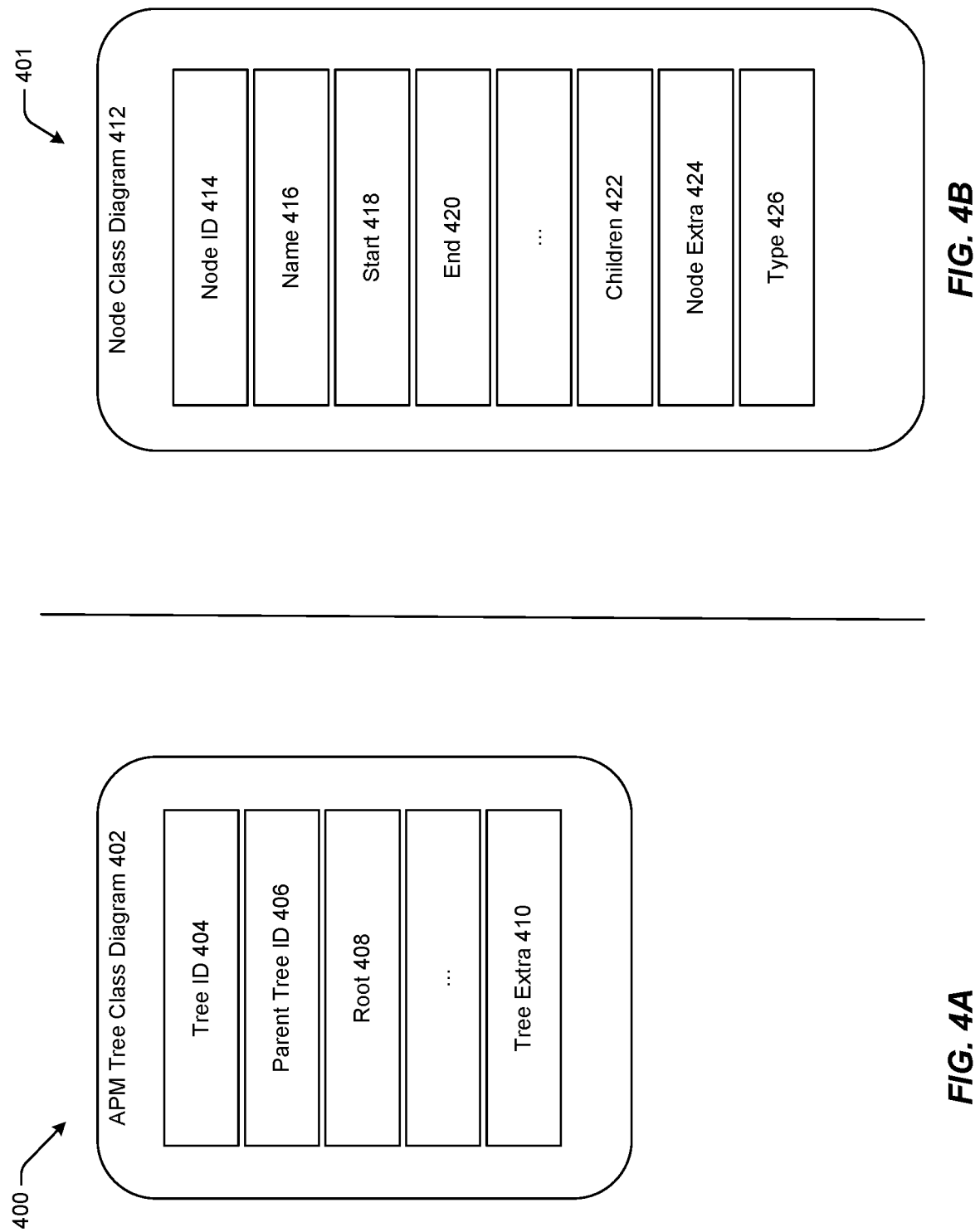
FIG. 4A shows a class diagram for an application performance monitoring (APM) tree according to an embodiment.
FIG. 4B shows a class diagram for an application performance monitoring (APM) node according to an embodiment.

FIG. 4A shows a class diagram 400 for an application performance monitoring (APM) tree according to an embodiment. APM tree class diagram 402 can contain a tree identifier (ID) 404, and APM tree class diagram 402 can contain a parent tree identifier (I)D 406 if the APM tree depends from another tree. An APM tree can depend from another tree if the parent tree contains a service node (e.g., service node 312a or service node 312b). A service node can store the tracing information for a microservice call, and a microservice call can generate a dependent tree. Root 408 can be a value that stores the ID of the APM tree's root node (e.g., root node 304), and tree extra 410 can store information about the APM tree's overhead.

FIG. 4B shows a class diagram 400 for an application performance monitoring (APM) node according to an embodiment. Node class diagram 412 can store information about individual nodes including service nodes (e.g., service nodes 312a-b) or function nodes (e.g., function nodes 310a-e). Node identifier (ID) 414 can be a unique identifier that identifies the node, and name 416 can be a string containing a name for the node. Start 418 and end 420 can be quantitative values indicating values for the beginning and end of the interval represented by the node. If the node is tracing latency, start 418 can contain a timestamp for when the process represented by the node began and end 420 can contain a timestamp for when the process terminated. If the node is tracing memory consumption, start 418 can be the memory usage at the beginning of the traced process, and end 420 can be the memory usage at the end of the traced process.

Children 422 can contain an ID for any nodes that depend from the node represented by node ID 414. A child node can be generated if a traced function or service calls another function or service. Node extra 424 can information that is not defined in node class diagram 412 including function arguments, exceptions, etc. Type 426 can indicate the node type, and, for instance, type 426 can indicate whether the node represented by node ID 414 is a function node (e.g., function nodes 310a-e) or a service node (e.g., service nodes 312a-b).

Figure 5:
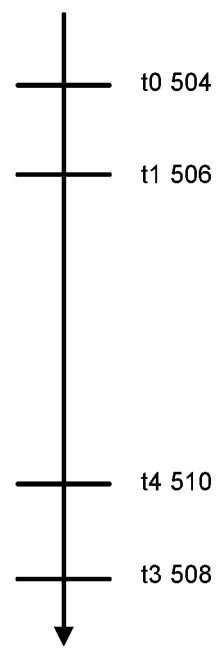
FIG. 5 shows a simplified application performance monitoring (APM) timeline according to an embodiment.

FIG. 5 shows a simplified application performance monitoring (APM) timeline 500 according to an embodiment. The timeline 502 can be used to provide the latency overhead for an APM tree (e.g., APM tree 302). Driver code can run before and after the target code is called. For example, APM timeline 500 shows the timing information for an intercept function from a driver code. The driver code's overhead can be calculated while the tracking code is running without the target code.

Continuing with the example, t0 504 can be an intercept function's start time and t1 506 can be a target code's start time (e.g., start 418). The end time for the target code can be t3 508 (e.g., end 420) and the end time for the intercept function can be t4 510. The overhead for the intercept function can be determined by calculating the amount of time that the intercept function is running without the target function. The overhead for APM tree 302 can be provided as an amount of time or as a percentage of the total execution time. Continuing the example, the overhead can be calculated with the following formula:

$$\text{Overhead} = (t1 - t0) + (t4 - t3) \qquad (1)$$

Where t0 is t0 504, t1 is t1 506, t2 is t2 508, and t3 is t3 510.

Figure 6:
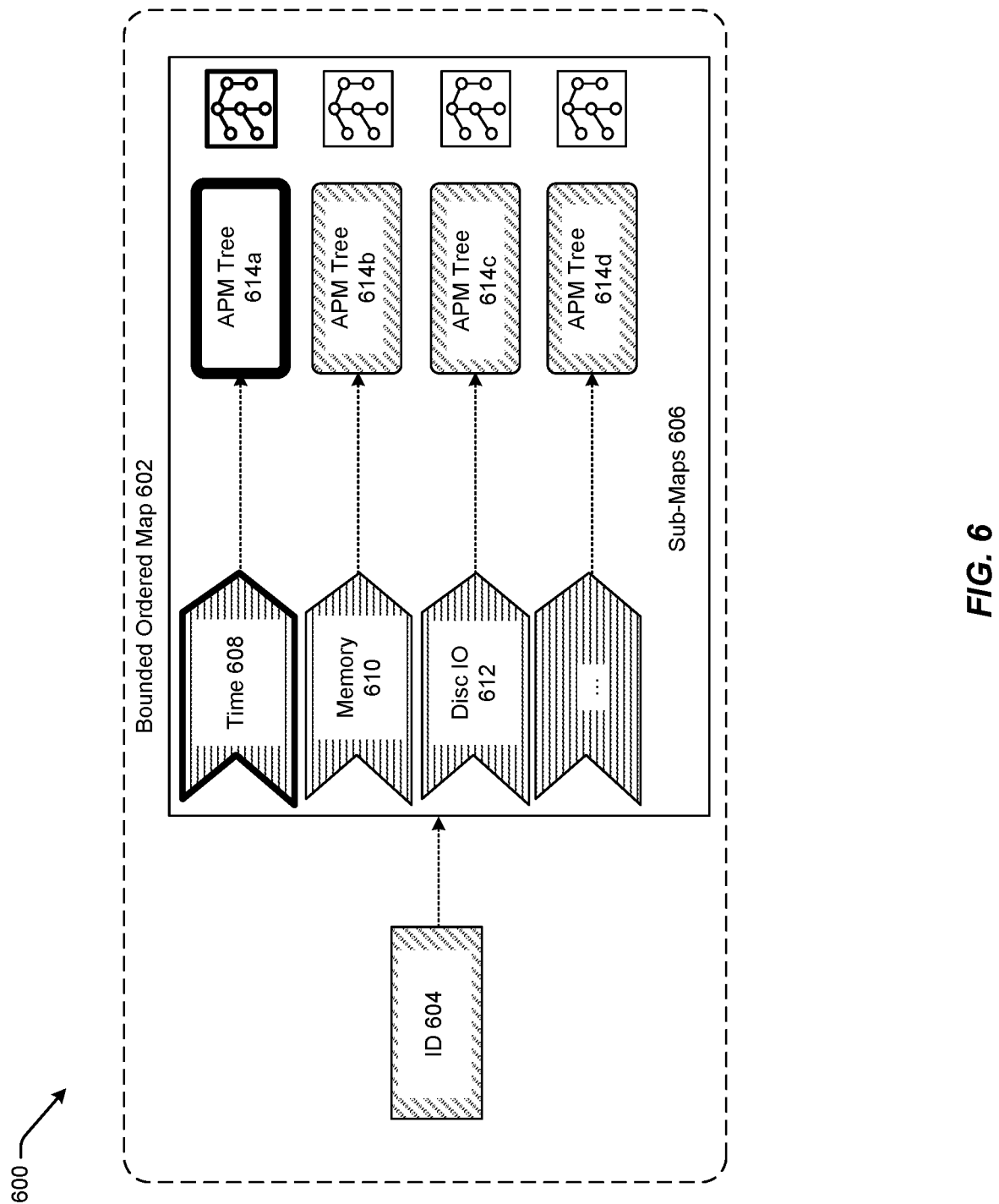
FIG. 6 is a simplified diagram of a map structure 600 according to an embodiment.

FIG. 6 is a simplified diagram of a map structure 600 according to an embodiment. Bounded ordered map 602 can be the outer layer of a bounded two-layer map that can be constructed by the driver code (e.g., driver code 202). Bounded ordered map 602 can be a fast key lookup data structure that can index its individual elements (e.g., Python dictionary, PHP associated array, Ruby hash, C++ map, etc.) An identifier (ID) 604, such as a universally unique identifier (UUID), can be the key string for bounded ordered map 602. The value for bounded ordered map can be one or more sub-maps 606.

Sub-maps 606 can be the same type of data structure as bounded ordered map 602. The key for sub-maps 606 can be a string with the name of one or more application performance metrics. For instance, the sub-map keys 606 can include time 608, memory 610, disk input/output (IO) 612, etc. The value for sub-maps can be a APM tree like APM tree 302.

Figure 7:
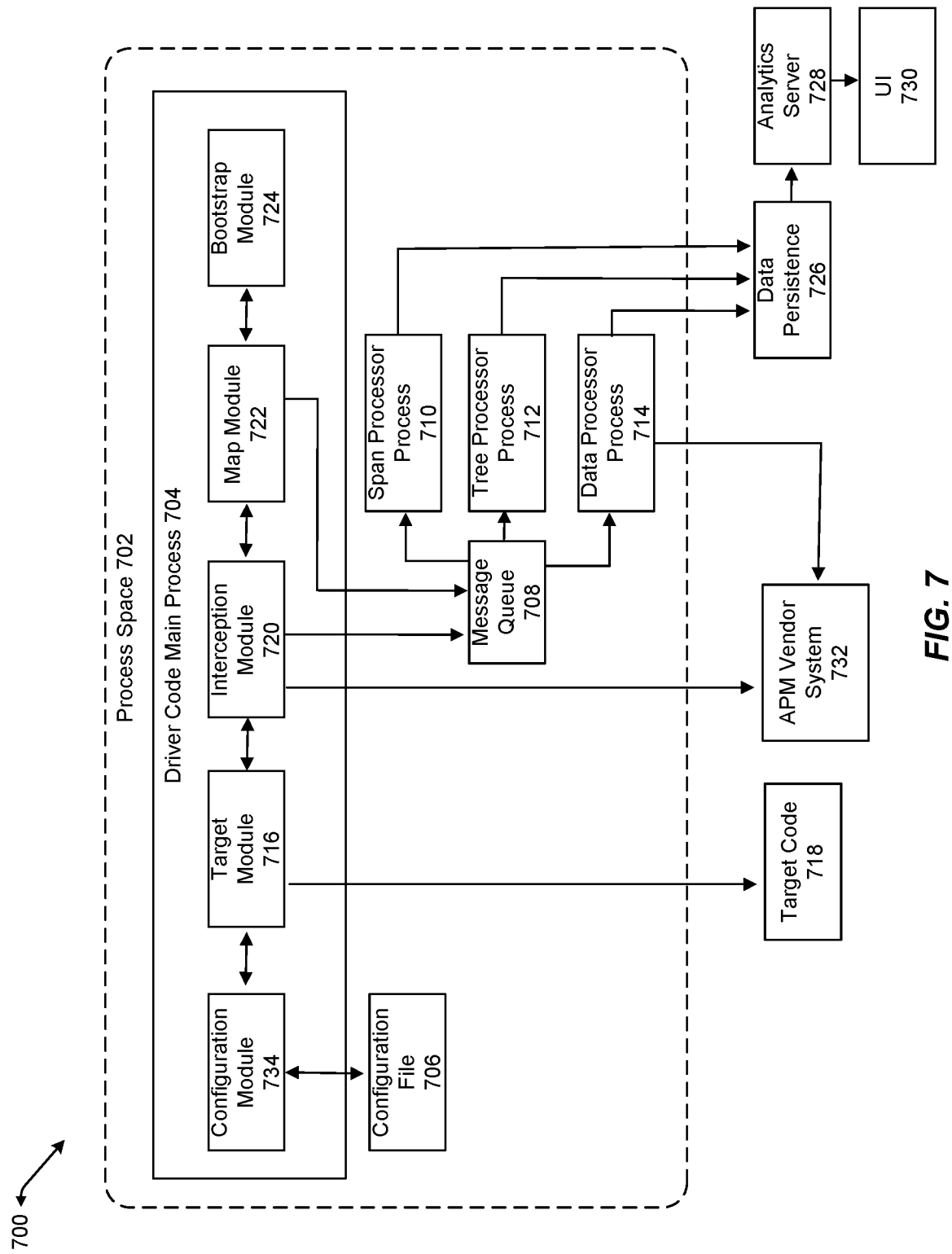
FIG. 7 is a simplified diagram of an application monitoring (APM) system according to an embodiment.

FIG. 7 is a simplified diagram of an application monitoring (APM) system 700 according to an embodiment. The application monitoring system 700 can be used to monitor a monolithic architecture (e.g., monolithic software application 100) or a microservice (e.g., user interface 114, business logic microservices 116a-e, data access layer microservice 118, etc.). Application performance monitoring system 700 can be an example of an APM system instance.

The process space 702 can contain the driver code main process 704. Process space 702 can be similar to process space 206 and driver code main process 704 can be similar to driver code 202 described above. Driver code 702 can be executable code that collects information about the target code. Driver code 702 can be similar to an agent, but driver code 702 can collect information from executable code or one or more modules, and, for example, the information can be collected from target code 718. Driver code main process 704 can also include a configuration module 734 that can load a configuration file 706. Configuration file 706 can be similar to configuration file 208 disclosed above in relation to FIG. 2. In some circumstances, the functions that the driver code 702 can trace can be declared in configuration file 706. In other circumstances, the functions can be declared in driver code 702 without configuration file 706. The configuration can specify one or more intercept functions.

Configuration file 706 can specify how performance monitoring data is sent to or stored in in data persistence 726. APM data can be sent or stored in a span format, and a span processor process 710 can be generated if configuration file 706 specifies a span format. A tree processor process 712 can be generated if configuration file 706 specifies that the performance monitoring data is to be sent or stored as an APM tree or interval tree.

A data processor process 714 can be generated if configuration file 706 specifies that the APM data is stored in an alternative format. An alternative format can be a format that is not a tree format or a span format. For instance, an alternative APM data format can be used to send APM data to a third-party system (e.g., Apache Kafka). Third-party systems can include application performance monitoring (APM) vendor systems such as Zipkin or Jager. In some circumstances, how data is stored or routed can be specified in driver main process 704.

Target module 716 in driver code main process 704 can load the target code 718 which can be the code for the monitored program. Target code 718 can be plain text source code or a binary-format module code. The interception module 720 can perform tracing configuration for the target code 718. Tracing configuration can include at least one of recording the memory address of one or more functions to be traced, dynamically constructing new intercept functions for one or more functions to be traced, or replacing the original function's addresses with the address of a new intercept function. Intercept functions can be similar to the intercept functions described in relation to FIGS. 2 and 4. The map module 722 can contain one or more map structures where the APM data can be stored. The map structure can be a two-layer ordered bounded map data structure (e.g., bounded ordered map 602), and the size of the map can be specified by configuration file 706.

Bootstrap module 724 can call the entrypoint function of target code 718 to start the program. As the program runs, one or more functions from target code 718 can be intercepted and traces can be recorded as APM data in the map structure. If the map size exceeds a threshold, the APM data can be sent to data persistence 726, and data persistence 726 can be similar to data persistence 210, and data persistence 726 can be one or more computing devices that can store data and provide access to that data. Data persistence 726 can employ a filesystem or a database system to store APM data. The filesystem can be a native filesystem such as the fourth extended filesystem (ext4), file allocation table (FAT), etc. The filesystem can be a cloud file system like Amazon simple storage service (S3), Google cloud platform (GCP) object storage, etc. The database management system can include relational database management systems (RDBMS) such as MySQL, Postgre SQL, Maria DB, etc. The database management system can also include non-relational database systems (NoSQLs) such as Apache Cassandra, Elasticsearch, etc.

Data persistence 726 can be a large scale data platform such as Spark, Hive, Hadoop, etc, or a distributed database management system (DBMS) such as Microsoft SQL data warehouse (DW), Amazon Redshift, Google Big Query, etc. APM data can be sent from data persistence 726 to analytics server 728. The APM data can be organized or consolidated to facilitate searching or displaying the data. Queries of analytics server 728 can be received at user interface (UI) 730, and the APM data, or search results, can be provided to the user via UI 730. APM data can be sent to data persistence 726 via message queue 708 and at least one of span processor process 710, tree processor process 712, or data processor process 714. In some circumstances, alternative format APM data can be sent directly from the interception module 720 to an APM vendor system 732. Data processor process 714 can send alternative format APM data to APM vendor system 732.

Figure 8:
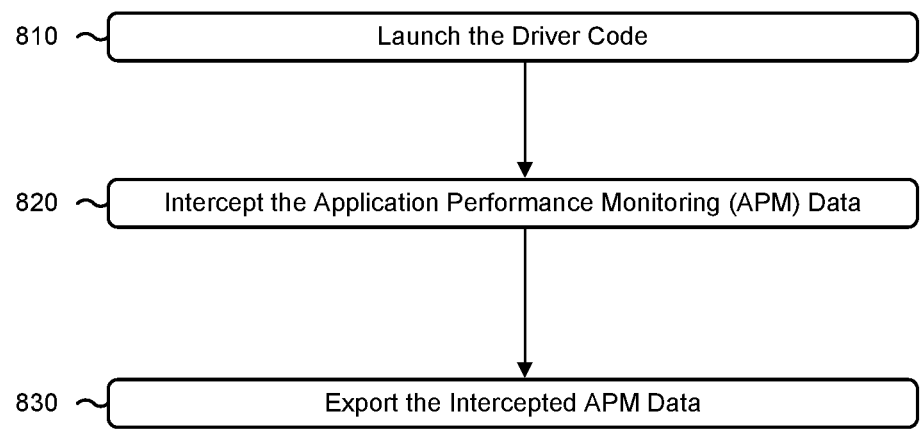
FIG. 8 is a simplified flowchart of a process for application performance monitoring (APM) according to an embodiment.

FIG. 8 is a simplified flowchart of a process 800 for application performance monitoring (APM) according to an embodiment. This process is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The orders in which the operations are described are not intended to be construed as a limitation, and any number of the described operations can be combined in any order and/or in parallel to implement the processes or the method.

Turning to process 800 in greater detail, at block 810, the driver code can be launched. The driver code can be driver code main process 704 and the driver code can be launched in process space 702. Launching the driver code can include retrieving configuration file 706. Configuration module 734 can retrieve configuration file 706 from a user interface, a computing device, a data persistence, a computing device, a database, etc. Launching the driver code can also include loading the target code 718. The target module 716 can be used to load target code 718.

Interception module 720 can receive a list of functions in target code 718 that are to be traced. Configuration module 734 can provide the list of functions to interception module 720, and interception module 720 can construct one or more intercept functions with one or more intercept address. Constructing an intercept function can include recording at least one intercept address for at least one function in the list of functions. The function addresses or the intercept addresses can be memory addresses, and at least one function address can be replaced with an intercept address. The function address can be a memory address for a target code function and the intercept address can be a memory address for a driver code intercept function.

At block 820, APM data can be intercepted. Bootstrap module 724 can call the entrypoint for target code 718 causing target code 718 to run. During tracing, messages intended for a function address can be sent to an intercept address instead and the messages can be received by the intercept function at interception module 720. The intercept function can record APM data about the message and the intercept function can forward the message to the intended function address. The APM data can be sent from interception module 720 to map module 722.

Map module 722 can construct a APM tree from the intercepted APM data. The APM tree (e.g., APM tree 302) can be stored within a bounded ordered map such as bounded ordered map 602. A function node in the APM tree, such as function nodes 310*a-e*, can store APM data collected by intercept functions. If a first target code function calls a second target code function, the APM data for the first target code function can be stored as a parent function node (e.g., function node 310*a*) and the APM data for the second target code function can be stored as a child node (e.g., function node 310*b*).

At block 830, the intercepted APM data can be exported. An APM tree generated from intercepted APM data can be sent to message queue 708 if the size of the bounded ordered map exceeds a threshold, if the target code finishes, or in response to an event. A tree processor process 712 can be generated to send APM trees from message queue 708 to data persistence 726. One or more individual spans from an APM tree (e.g., individual nodes) can be sent from map module 722 to message queue 708. A span processor process 710 can be generated to send individual spans from message queue 708 to data persistence 726. Data processor process 714 can be generated to send alternative format data to data persistence 726. Data persistence 726 can forward data, including APM trees, individual spans, or alternative format data, to analytics server 728. Application performance data can be forwarded from analytics server 728 to UI 730.

Interception module 720 can send alternative format APM data intercepted by an intercept function to APM vendor system 732. The alternative format APM data can be sent to the APM vendor system as the data is intercepted. Interception module 720 can send intercepted alternative format APM data to message queue 708. Alternative format APM data can be APM data that is stored in a format that is not a tree format or a span format. For instance, an alternative format can be a format that is used by a third-party system (e.g., Apache Kafka). Third-party systems can include APM vendor systems such as Zipkin or Jager.

Figure 9:
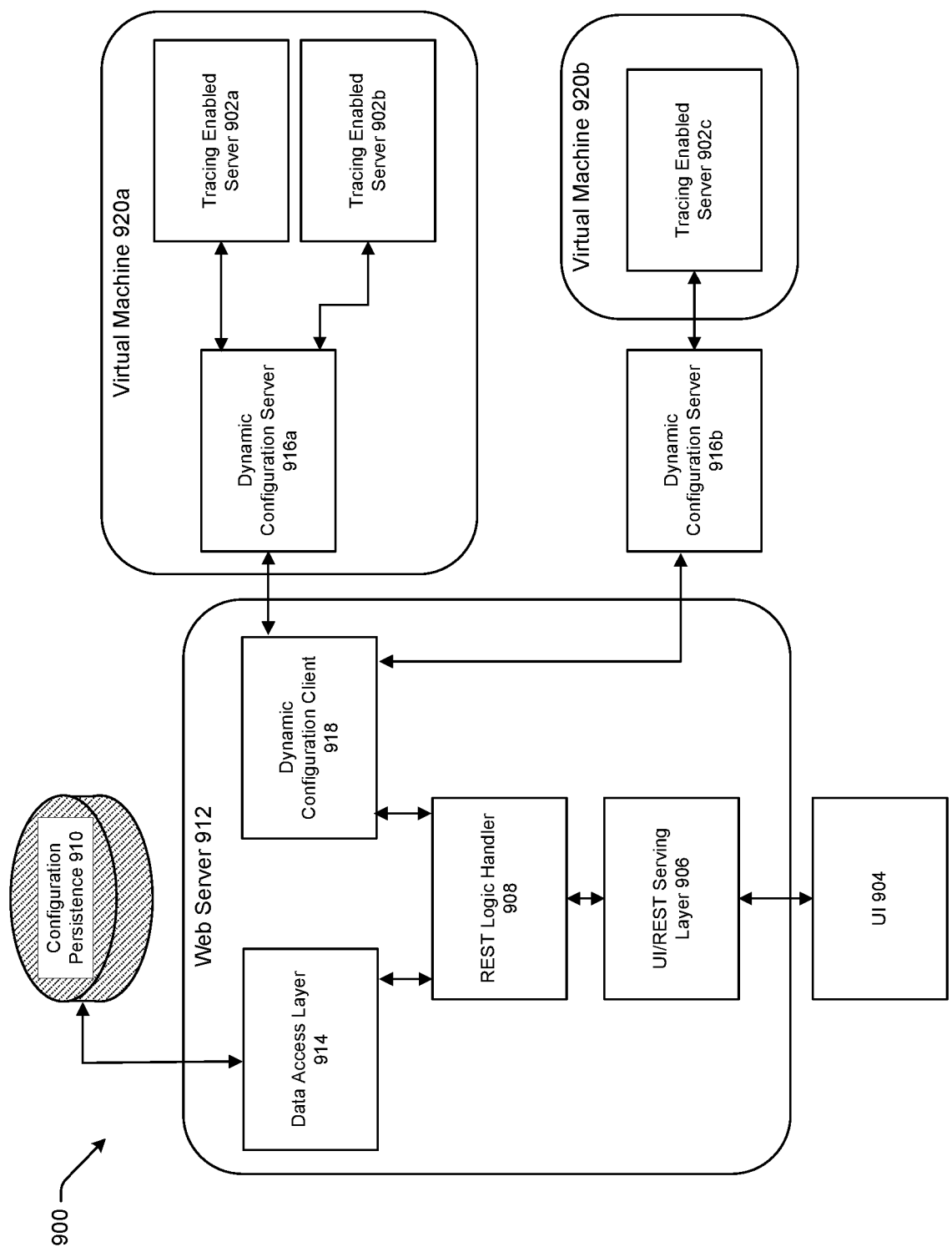
FIG. 9 is a simplified diagram of a tracing architecture for online application performance monitoring (APM) according to an embodiment.

FIG. 9 is a simplified diagram of a tracing architecture 900 for online application performance monitoring (APM) according to an embodiment. Online applications can be long-running applications with dynamic inputs, and online applications include web servers, machine learning model servers, Google remote procedure call (gRPC) servers, database servers, etc. This process is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The orders in which the operations are described are not intended to be construed as a limitation, and any number of the described operations can be combined in any order and/or in parallel to implement the processes or the method.

Online applications can have distributed architectures with one or more microservices (e.g., distributed software architecture 101). Individual microservices may be traced using an instance of the application monitoring system 700, and a tracing architecture 900 can be used to configure and coordinate the APM system instances. One or more APM system instances of the application monitoring system 700 can be contained in one or more tracing enabled servers (e.g., tracing enabled servers 902a-c).

User interface (UI) 904 can be a web based user interface that can be used to generate one or more configuration files (e.g., configuration file 706) via user inputs. The configuration files can contain addresses for target code and which functions or modules are to be traced. A UI/representational state transfer (REST) serving layer 906 can receive the one or more configuration files from UI 904 and forward the files to the REST logic handler 908. The UI/REST serving layer 906 can receive the configuration files in response to sending a REST call to UI 904.

The one or more configuration files can be written on to the configuration persistence 910 by REST logic handler 908. Configuration persistence 910 can be located in web server 912 or in a different machine. Web server or the different machine can be a bare metal machine or a virtual machine. Configuration persistence 910 can be a database such as SQLite, MySQL, PostgreSQL, etc., or Configuration persistence can be a cache server such as Redis, Memcached, etc. The one or more configuration files can be written on to configuration persistence via data access layer 914.

The one or more configuration files can be written on to one or more dynamic configuration servers (e.g., dynamic configuration servers 916a-b) by REST logic handler 908. Dynamic configuration client 918 can write the configuration files on to one or more dynamic configuration servers (e.g., dynamic configuration servers 916a-b) in response to a call from REST logic handler 908.

Tracing enabled servers 902a-c can be located in one or more virtual machines (e.g., virtual machines 920a-b). Virtual machines 920a-b can be virtual machines or bare metal machines, and dynamic configuration servers, such as dynamic configuration server 916a can be located in the same virtual machine as one or more tracing enabled servers. For example, dynamic configuration server 916a and tracing enabled servers 902a-b can be located in virtual machine 920a. In some circumstances, a dynamic configuration server can be located in a different virtual machine than a tracing enabled server. For example, dynamic configuration server 916b can be located outside of virtual machine 920b.

Figure 10:
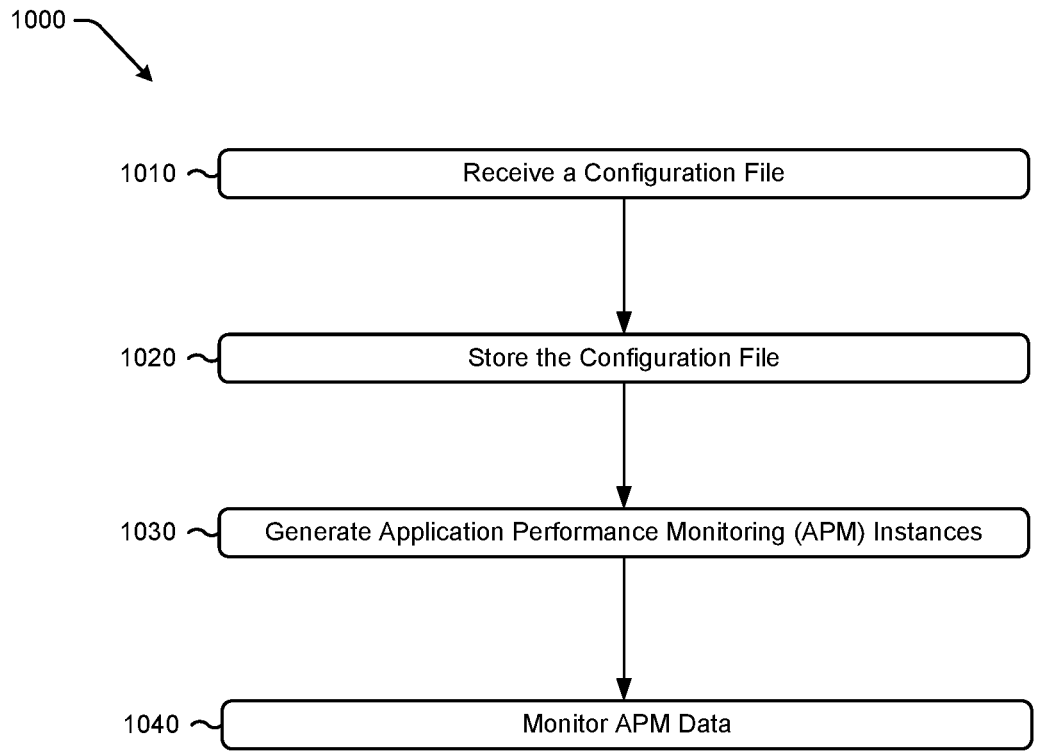
FIG. 10 is a simplified flowchart of a process for tracing for online application performance monitoring (APM) according to an embodiment.

FIG. 10 is a simplified flowchart of a process 1000 for tracing for online application performance monitoring (APM) according to an embodiment. This process is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The orders in which the operations are described are not intended to be construed as a limitation, and any number of the described operations can be combined in any order and/or in parallel to implement the processes or the method.

At block 1010, a configuration file can be received. The configuration file can be received from UI 904 at UI/REST serving layer 906. REST logic handler 908 can receive the configuration file from UI/REST serving layer 906.

At block 1020, the configuration file can be stored. REST logic handler can write the configuration file to configuration persistence 910 via data access layer 914. REST logic handler 908 can write the configuration file to at least one of dynamic configuration servers 916a-b via dynamic configuration client 918.

At block 1030, APM instances can be generated. Generating an APM instance can include generating one or more tracing enabled servers 902a-c. One or more APM system instances can be created in tracing enabled servers 902a-c by dynamic configuration servers 916a-b. Tracing enabled servers 902a-c can include at least one of a driver code (e.g., driver code 202), target code (e.g., target code 204), or a configuration file (e.g., configuration file 208).

At block 1040, the APM data can be monitored. APM data can be monitored by the APM instances in tracing enabled servers 902a-c according to process 800 described above. The APM instances can trace APM data for functions or services identified in the configuration file.

Figure 11:
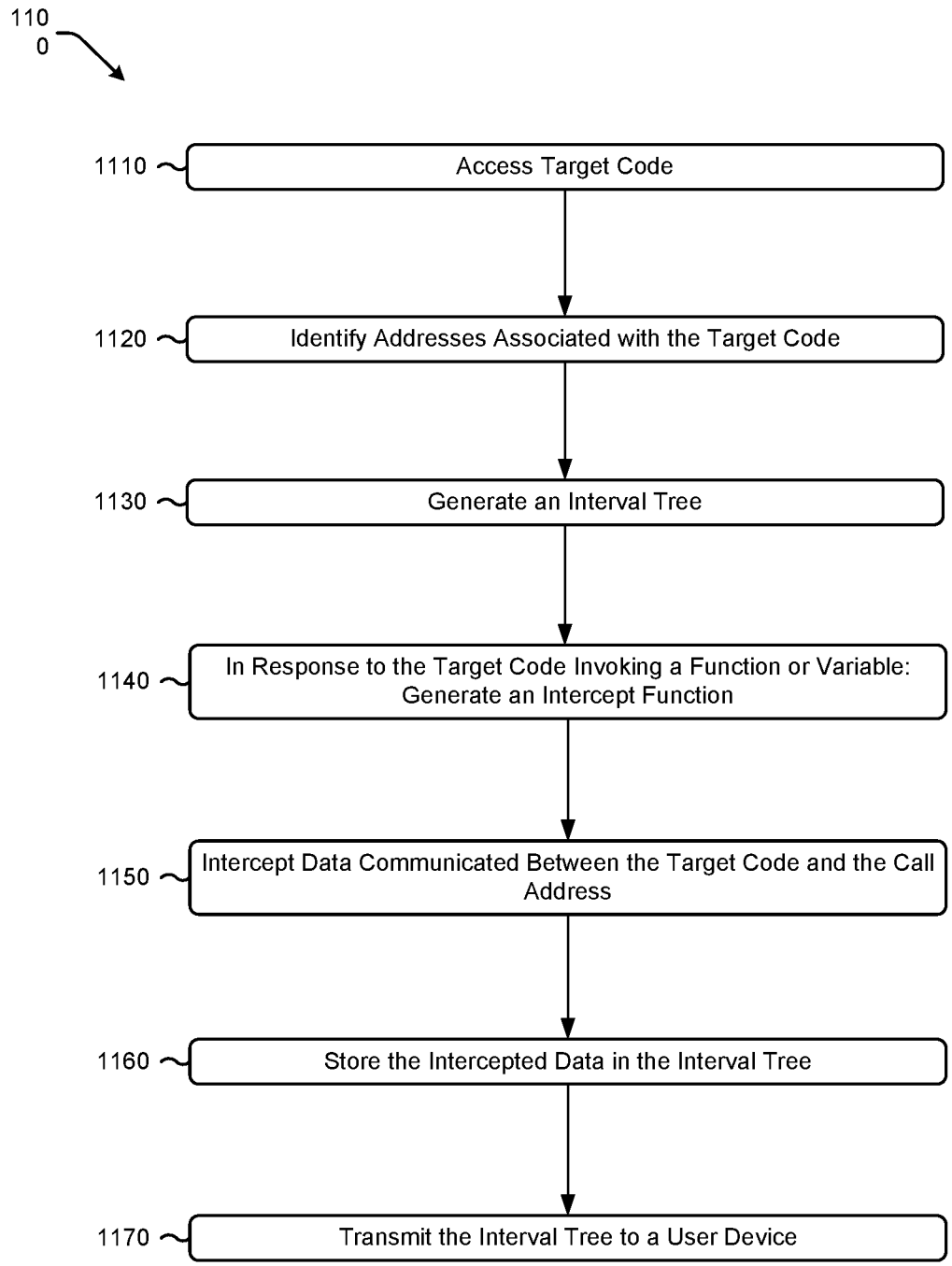
FIG. 11 is a simplified flowchart of a method for application performance monitoring (APM) according to an embodiment.

FIG. 11 is a simplified flowchart of a method 1100 for application performance monitoring (APM) according to an embodiment. This method is illustrated as a logical flow diagram, each operation of which can be implemented in hardware, computer instructions, or a combination thereof.

In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The orders in which the operations are described are not intended to be construed as a limitation, and any number of the described operations can be combined in any order and/or in parallel to implement the processes or the method.

Turning to method 1100 in greater detail, at block 1110, the target code can be accessed. The target code can be similar to target code 204 described above. The target code can be accessed by a driver code such as driver code 202 described above. The target code can be runnable code or a module. In some circumstances, the target code can be a Python code. One or more functions or one or more services can be contained in the target code. The target code can be accessed by one or more tracking functions in the driver code. The target code can be code for a monolithic application (e.g., monolithic software application 100) or code for a distributed system (e.g., distributed software architecture 101).

At block 1120, addresses or variables associated with the target code can be identified. At least one of one or more addresses or one or more variables can be identified. The target code can be identified with the driver code. The identified addresses can be one or more function addresses for one or more functions in the target code.

At block 1130, an interval tree can be generated. The interval tree can be an APM tree such as APM tree 302. The APM tree can contain a root node (e.g., root node 304), one or more service nodes (e.g., service nodes 312), or one or more function nodes (e.g., function nodes 310). The interval tree can contain one or more subtrees such as function subtree 306 or service subtree 308.

At block 1140, an intercept function can be generated. The intercept function can be generated in response to the target code invoking a function or variable. The intercept function can be generated by interception module 720. A configuration file, such as configuration file 706, can be used to determine whether the target code invoking a function or variable will not cause an intercept function to be generated. In some circumstances, the configuration file can indicate that one or more test code functions or one or more test code variables are excluded from tracing, and an intercept function may not be created for excluded functions or variables.

At block 1150, data communicated between the target code and the call address can be intercepted. The call address can be one of the addresses identified at block 1120. The communicated data can be intercepted by the intercept function. The intercepted data can comprise program runtime information. The intercepted data can be intercepted by an intercept function using an intercept address. The intercepted data can be APM data. The intercept function can replace the function address with an intercept address and messages intended for the target code function address can be routed to the intercept function via the intercept addresses. The intercept function can record APM data about the intercepted messages and forward the intercepted messages to the target code function address.

At block 1160, the intercepted data can be stored in the interval tree. The intercepted data can be stored as at least one of a service node or a function node in the interval tree. The intercepted data can be stored in one or more subtrees in the interval trees. The one or more subtrees can be at least one of a service subtree or a function subtree. The interval tree can be transmitted to storage as an entire tree (e.g., transmitted via tree processor process 712 to data persistence 726). Individual spans, or nodes, from the interval tree can be transmitted to storage (e.g., transmitted via span processor process 710 to data persistence 726). Interval tree data can also be sent as alternative format APM data to data persistence 726 via data processor process 714.

At block 1170, the interval tree can be transmitted to a user device. The transmitted tree can be reconstructed at the user device and displayed. The user device can be UI 730. The data can be transmitted to the user storage via an analytics server such as analytics server 728.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 12:
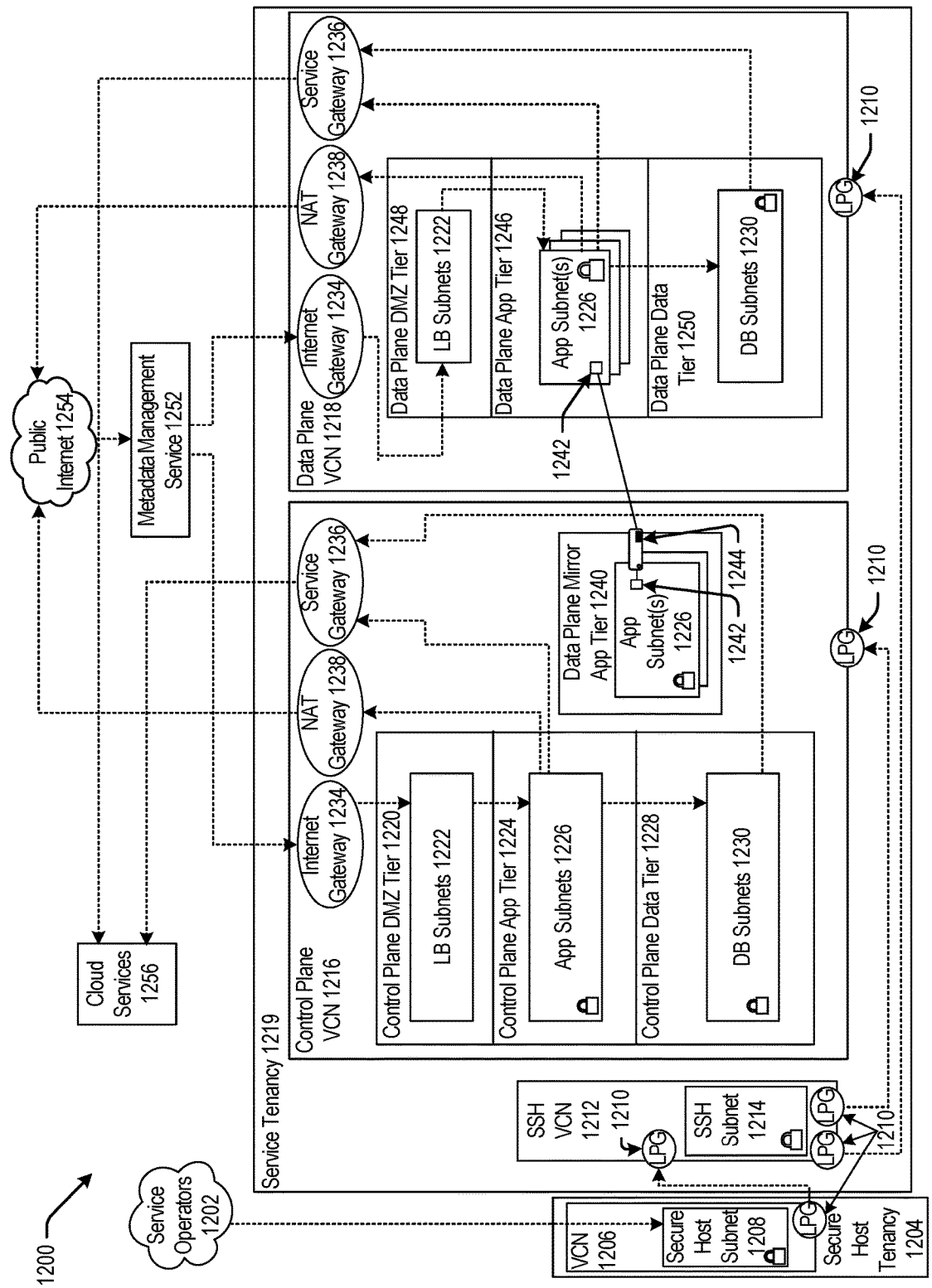
FIG. 12 is a block diagram illustrating one pattern for implementing a cloud infrastructure as a service system, according to at least one embodiment.

FIG. 12 is a block diagram 1200 illustrating an example pattern of an IaaS architecture, according to at least one embodiment. Service operators 1202 can be communicatively coupled to a secure host tenancy 1204 that can include a virtual cloud network (VCN) 1206 and a secure host subnet 1208. In some examples, the service operators 1202 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1206 and/or the Internet.

The VCN 1206 can include a local peering gateway (LPG) 1210 that can be communicatively coupled to a secure shell (SSH) VCN 1212 via an LPG 1210 contained in the SSH VCN 1212. The SSH VCN 1212 can include an SSH subnet 1214, and the SSH VCN 1212 can be communicatively coupled to a control plane VCN 1216 via the LPG 1210 contained in the control plane VCN 1216. Also, the SSH VCN 1212 can be communicatively coupled to a data plane VCN 1218 via an LPG 1210. The control plane VCN 1216 and the data plane VCN 1218 can be contained in a service tenancy 1219 that can be owned and/or operated by the IaaS provider.

The control plane VCN 1216 can include a control plane demilitarized zone (DMZ) tier 1220 that acts as a perimeter network (e.g., portions of a corporate network between the corporate intranet and external networks). The DMZ-based servers may have restricted responsibilities and help keep breaches contained. Additionally, the DMZ tier 1220 can include one or more load balancer (LB) subnet(s) 1222, a control plane app tier 1224 that can include app subnet(s) 1226, a control plane data tier 1228 that can include database (DB) subnet(s) 1230 (e.g., frontend DB subnet(s) and/or backend DB subnet(s)). The LB subnet(s) 1222 contained in the control plane DMZ tier 1220 can be communicatively coupled to the app subnet(s) 1226 contained in the control plane app tier 1224 and an Internet gateway 1234 that can be contained in the control plane VCN 1216, and the app subnet(s) 1226 can be communicatively coupled to the DB subnet(s) 1230 contained in the control plane data tier 1228 and a service gateway 1236 and a network address translation (NAT) gateway 1238. The control plane VCN 1216 can include the service gateway 1236 and the NAT gateway 1238.

The control plane VCN 1216 can include a data plane mirror app tier 1240 that can include app subnet(s) 1226. The app subnet(s) 1226 contained in the data plane mirror app tier 1240 can include a virtual network interface controller (VNIC) 1242 that can execute a compute instance 1244. The compute instance 1244 can communicatively couple the app subnet(s) 1226 of the data plane mirror app tier 1240 to app subnet(s) 1226 that can be contained in a data plane app tier 1246.

The data plane VCN 1218 can include the data plane app tier 1246, a data plane DMZ tier 1248, and a data plane data tier 1250. The data plane DMZ tier 1248 can include LB subnet(s) 1222 that can be communicatively coupled to the app subnet(s) 1226 of the data plane app tier 1246 and the Internet gateway 1234 of the data plane VCN 1218. The app subnet(s) 1226 can be communicatively coupled to the service gateway 1236 of the data plane VCN 1218 and the NAT gateway 1238 of the data plane VCN 1218. The data plane data tier 1250 can also include the DB subnet(s) 1230 that can be communicatively coupled to the app subnet(s) 1226 of the data plane app tier 1246.

The Internet gateway 1234 of the control plane VCN 1216 and of the data plane VCN 1218 can be communicatively coupled to a metadata management service 1252 that can be communicatively coupled to public Internet 1254. Public Internet 1254 can be communicatively coupled to the NAT gateway 1238 of the control plane VCN 1216 and of the data plane VCN 1218. The service gateway 1236 of the control plane VCN 1216 and of the data plane VCN 1218 can be communicatively couple to cloud services 1256.

In some examples, the service gateway 1236 of the control plane VCN 1216 or of the data plane VCN 1218 can make application programming interface (API) calls to cloud services 1256 without going through public Internet 1254. The API calls to cloud services 1256 from the service gateway 1236 can be one-way: the service gateway 1236 can make API calls to cloud services 1256, and cloud services 1256 can send requested data to the service gateway 1236. But, cloud services 1256 may not initiate API calls to the service gateway 1236.

In some examples, the secure host tenancy 1204 can be directly connected to the service tenancy 1219, which may be otherwise isolated. The secure host subnet 1208 can communicate with the SSH subnet 1214 through an LPG 1210 that may enable two-way communication over an otherwise isolated system. Connecting the secure host subnet 1208 to the SSH subnet 1214 may give the secure host subnet 1208 access to other entities within the service tenancy 1219.

The control plane VCN 1216 may allow users of the service tenancy 1219 to set up or otherwise provision desired resources. Desired resources provisioned in the control plane VCN 1216 may be deployed or otherwise used in the data plane VCN 1218. In some examples, the control plane VCN 1216 can be isolated from the data plane VCN 1218, and the data plane mirror app tier 1240 of the control plane VCN 1216 can communicate with the data plane app tier 1246 of the data plane VCN 1218 via VNICs 1242 that can be contained in the data plane mirror app tier 1240 and the data plane app tier 1246.

In some examples, users of the system, or customers, can make requests, for example create, read, update, or delete (CRUD) operations, through public Internet 1254 that can communicate the requests to the metadata management service 1252. The metadata management service 1252 can communicate the request to the control plane VCN 1216 through the Internet gateway 1234. The request can be received by the LB subnet(s) 1222 contained in the control plane DMZ tier 1220. The LB subnet(s) 1222 may determine that the request is valid, and in response to this determination, the LB subnet(s) 1222 can transmit the request to app subnet(s) 1226 contained in the control plane app tier 1224. If the request is validated and requires a call to public Internet 1254, the call to public Internet 1254 may be transmitted to the NAT gateway 1238 that can make the call to public Internet 1254. Metadata that may be desired to be stored by the request can be stored in the DB subnet(s) 1230.

In some examples, the data plane mirror app tier 1240 can facilitate direct communication between the control plane VCN 1216 and the data plane VCN 1218. For example, changes, updates, or other suitable modifications to configuration may be desired to be applied to the resources contained in the data plane VCN 1218. Via a VNIC 1242, the control plane VCN 1216 can directly communicate with, and can thereby execute the changes, updates, or other suitable modifications to configuration to, resources contained in the data plane VCN 1218.

In some embodiments, the control plane VCN 1216 and the data plane VCN 1218 can be contained in the service tenancy 1219. In this case, the user, or the customer, of the system may not own or operate either the control plane VCN 1216 or the data plane VCN 1218. Instead, the IaaS provider may own or operate the control plane VCN 1216 and the data plane VCN 1218, both of which may be contained in the service tenancy 1219. This embodiment can enable isolation of networks that may prevent users or customers from interacting with other users', or other customers', resources. Also, this embodiment may allow users or customers of the system to store databases privately without needing to rely on public Internet 1254, which may not have a desired level of threat prevention, for storage.

In other embodiments, the LB subnet(s) 1222 contained in the control plane VCN 1216 can be configured to receive a signal from the service gateway 1236. In this embodiment, the control plane VCN 1216 and the data plane VCN 1218 may be configured to be called by a customer of the IaaS provider without calling public Internet 1254. Customers of the IaaS provider may desire this embodiment since database(s) that the customers use may be controlled by the IaaS provider and may be stored on the service tenancy 1219, which may be isolated from public Internet 1254.

Figure 13:
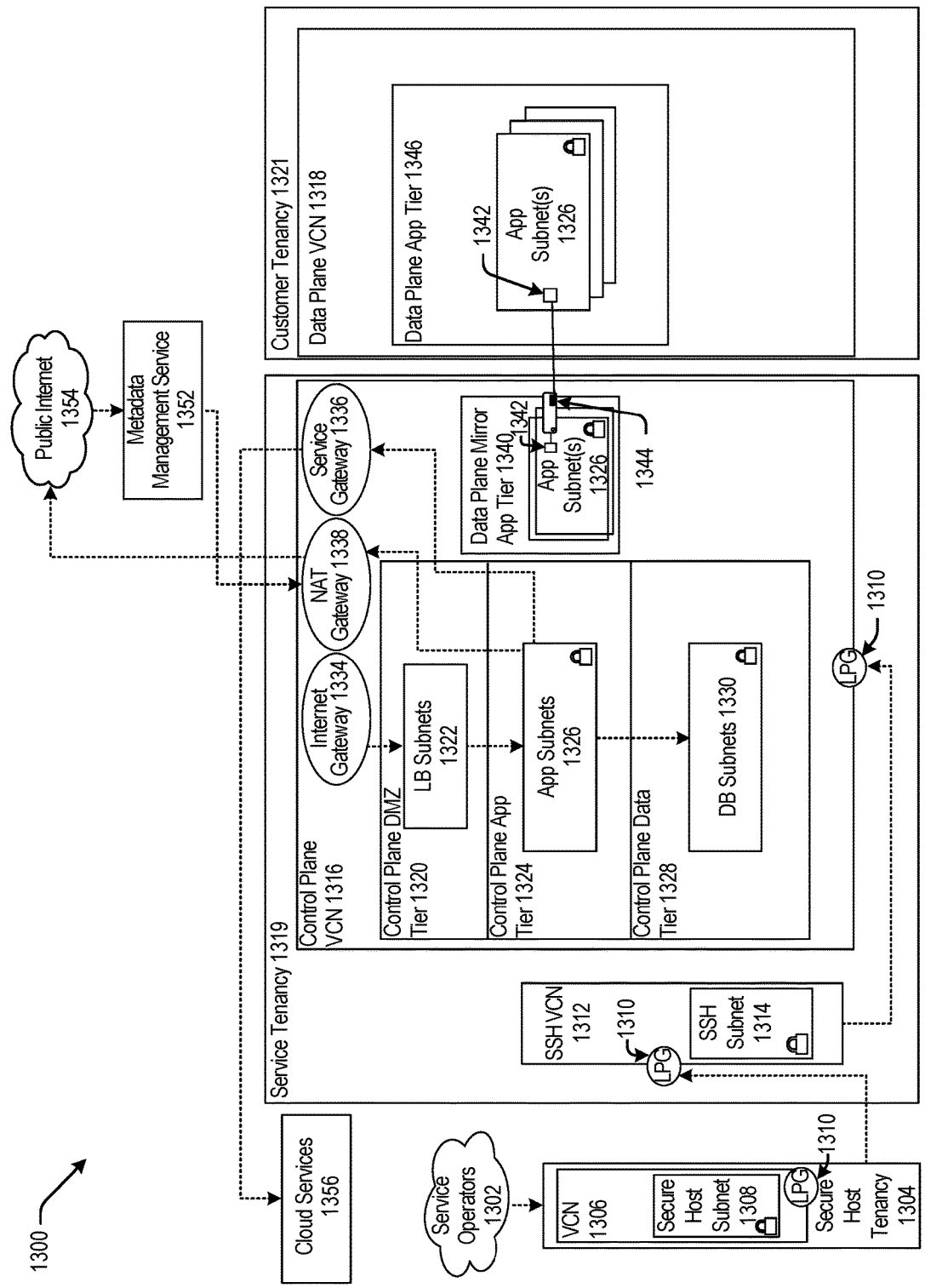
FIG. 13 is a block diagram illustrating another pattern for implementing a cloud infrastructure as a service system, according to at least one embodiment.

FIG. 13 is a block diagram 1300 illustrating another example pattern of an IaaS architecture, according to at least one embodiment. Service operators 1302 (e.g., service operators 1202 of FIG. 12) can be communicatively coupled to a secure host tenancy 1304 (e.g., the secure host tenancy 1204 of FIG. 12) that can include a virtual cloud network (VCN) 1306 (e.g., the VCN 1206 of FIG. 12) and a secure host subnet 1308 (e.g., the secure host subnet 1208 of FIG. 12). The VCN 1306 can include a local peering gateway (LPG) 1310 (e.g., the LPG 1210 of FIG. 12) that can be communicatively coupled to a secure shell (SSH) VCN 1312 (e.g., the SSH VCN 1212 of FIG. 12) via an LPG 1210 contained in the SSH VCN 1312. The SSH VCN 1312 can include an SSH subnet 1314 (e.g., the SSH subnet 1214 of FIG. 12), and the SSH VCN 1312 can be communicatively coupled to a control plane VCN 1316 (e.g., the control plane VCN 1216 of FIG. 12) via an LPG 1310 contained in the control plane VCN 1316. The control plane VCN 1316 can be contained in a service tenancy 1319 (e.g., the service tenancy 1219 of FIG. 12), and the data plane VCN 1318 (e.g., the data plane VCN 1218 of FIG. 12) can be contained in a customer tenancy 1321 that may be owned or operated by users, or customers, of the system.

The control plane VCN 1316 can include a control plane DMZ tier 1320 (e.g., the control plane DMZ tier 1220 of FIG. 12) that can include LB subnet(s) 1322 (e.g., LB subnet(s) 1222 of FIG. 12), a control plane app tier 1324 (e.g., the control plane app tier 1224 of FIG. 12) that can include app subnet(s) 1326 (e.g., app subnet(s) 1226 of FIG. 12), a control plane data tier 1328 (e.g., the control plane data tier 1228 of FIG. 12) that can include database (DB) subnet(s) 1330 (e.g., similar to DB subnet(s) 1230 of FIG. 12). The LB subnet(s) 1322 contained in the control plane DMZ tier 1320 can be communicatively coupled to the app subnet(s) 1326 contained in the control plane app tier 1324 and an Internet gateway 1334 (e.g., the Internet gateway 1234 of FIG. 12) that can be contained in the control plane VCN 1316, and the app subnet(s) 1326 can be communicatively coupled to the DB subnet(s) 1330 contained in the control plane data tier 1328 and a service gateway 1336 (e.g., the service gateway 1236 of FIG. 12) and a network address translation (NAT) gateway 1338 (e.g., the NAT gateway 1238 of FIG. 12). The control plane VCN 1316 can include the service gateway 1336 and the NAT gateway 1338.

The control plane VCN 1316 can include a data plane mirror app tier 1340 (e.g., the data plane mirror app tier 1240 of FIG. 12) that can include app subnet(s) 1326. The app subnet(s) 1326 contained in the data plane mirror app tier 1340 can include a virtual network interface controller (VNIC) 1342 (e.g., the VNIC of 1242) that can execute a compute instance 1344 (e.g., similar to the compute instance 1244 of FIG. 12). The compute instance 1344 can facilitate communication between the app subnet(s) 1326 of the data plane mirror app tier 1340 and the app subnet(s) 1326 that can be contained in a data plane app tier 1346 (e.g., the data plane app tier 1246 of FIG. 12) via the VNIC 1342 contained in the data plane mirror app tier 1340 and the VNIC 1342 contained in the data plane app tier 1346.

The Internet gateway 1334 contained in the control plane VCN 1316 can be communicatively coupled to a metadata management service 1352 (e.g., the metadata management service 1252 of FIG. 12) that can be communicatively coupled to public Internet 1354 (e.g., public Internet 1254 of FIG. 12). Public Internet 1354 can be communicatively coupled to the NAT gateway 1338 contained in the control plane VCN 1316. The service gateway 1336 contained in the control plane VCN 1316 can be communicatively couple to cloud services 1356 (e.g., cloud services 1256 of FIG. 12).

In some examples, the data plane VCN 1318 can be contained in the customer tenancy 1321. In this case, the IaaS provider may provide the control plane VCN 1316 for each customer, and the IaaS provider may, for each customer, set up a unique compute instance 1344 that is contained in the service tenancy 1319. Each compute instance 1344 may allow communication between the control plane VCN 1316, contained in the service tenancy 1319, and the data plane VCN 1318 that is contained in the customer tenancy 1321. The compute instance 1344 may allow resources, that are provisioned in the control plane VCN 1316 that is contained in the service tenancy 1319, to be deployed or otherwise used in the data plane VCN 1318 that is contained in the customer tenancy 1321.

In other examples, the customer of the IaaS provider may have databases that live in the customer tenancy 1321. In this example, the control plane VCN 1316 can include the data plane mirror app tier 1340 that can include app subnet(s) 1326. The data plane mirror app tier 1340 can reside in the data plane VCN 1318, but the data plane mirror app tier 1340 may not live in the data plane VCN 1318. That is, the data plane mirror app tier 1340 may have access to the customer tenancy 1321, but the data plane mirror app tier 1340 may not exist in the data plane VCN 1318 or be owned or operated by the customer of the IaaS provider. The data plane mirror app tier 1340 may be configured to make calls to the data plane VCN 1318 but may not be configured to make calls to any entity contained in the control plane VCN 1316. The customer may desire to deploy or otherwise use resources in the data plane VCN 1318 that are provisioned in the control plane VCN 1316, and the data plane mirror app tier 1340 can facilitate the desired deployment, or other usage of resources, of the customer.

In some embodiments, the customer of the IaaS provider can apply filters to the data plane VCN 1318. In this embodiment, the customer can determine what the data plane VCN 1318 can access, and the customer may restrict access to public Internet 1354 from the data plane VCN 1318. The IaaS provider may not be able to apply filters or otherwise control access of the data plane VCN 1318 to any outside networks or databases. Applying filters and controls by the customer onto the data plane VCN 1318, contained in the customer tenancy 1321, can help isolate the data plane VCN 1318 from other customers and from public Internet 1354.

In some embodiments, cloud services 1356 can be called by the service gateway 1336 to access services that may not exist on public Internet 1354, on the control plane VCN 1316, or on the data plane VCN 1318. The connection between cloud services 1356 and the control plane VCN 1316 or the data plane VCN 1318 may not be live or continuous. Cloud services 1356 may exist on a different network owned or operated by the IaaS provider. Cloud services 1356 may be configured to receive calls from the service gateway 1336 and may be configured to not receive calls from public Internet 1354. Some cloud services 1356 may be isolated from other cloud services 1356, and the control plane VCN 1316 may be isolated from cloud services 1356 that may not be in the same region as the control plane VCN 1316. For example, the control plane VCN 1316 may be located in "Region 1," and cloud service "Deployment 12," may be located in Region 1 and in "Region 2." If a call to Deployment 12 is made by the service gateway 1336 contained in the control plane VCN 1316 located in Region 1, the call may be transmitted to Deployment 12 in Region 1. In this example, the control plane VCN 1316, or Deployment 12 in Region 1, may not be communicatively coupled to, or otherwise in communication with, Deployment 12 in Region 2.

Figure 14:
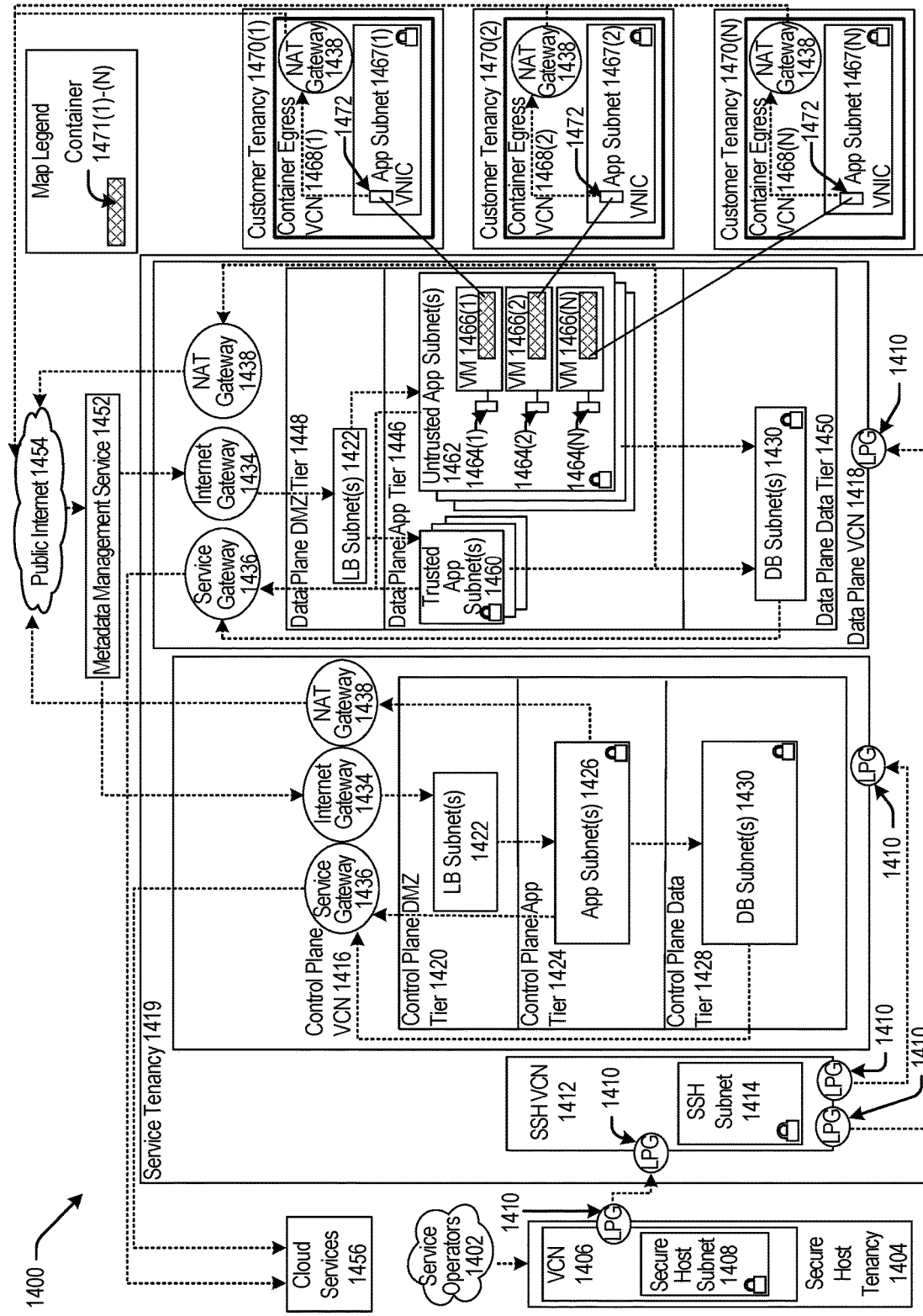
FIG. 14 is a block diagram illustrating another pattern for implementing a cloud infrastructure as a service system, according to at least one embodiment.

FIG. 14 is a block diagram 1400 illustrating another example pattern of an IaaS architecture, according to at least one embodiment. Service operators 1402 (e.g., service operators 1202 of FIG. 12) can be communicatively coupled to a secure host tenancy 1404 (e.g., the secure host tenancy 1204 of FIG. 12) that can include a virtual cloud network (VCN) 1406 (e.g., the VCN 1206 of FIG. 12) and a secure host subnet 1408 (e.g., the secure host subnet 1208 of FIG. 12). The VCN 1406 can include an LPG 1410 (e.g., the LPG 1210 of FIG. 12) that can be communicatively coupled to an SSH VCN 1412 (e.g., the SSH VCN 1212 of FIG. 12) via an LPG 1410 contained in the SSH VCN 1412. The SSH VCN 1412 can include an SSH subnet 1414 (e.g., the SSH subnet 1214 of FIG. 12), and the SSH VCN 1412 can be communicatively coupled to a control plane VCN 1416 (e.g., the control plane VCN 1216 of FIG. 12) via an LPG 1410 contained in the control plane VCN 1416 and to a data plane VCN 1418 (e.g., the data plane 1218 of FIG. 12) via an LPG 1410 contained in the data plane VCN 1418. The control plane VCN 1416 and the data plane VCN 1418 can be contained in a service tenancy 1419 (e.g., the service tenancy 1219 of FIG. 12).

The control plane VCN 1416 can include a control plane DMZ tier 1420 (e.g., the control plane DMZ tier 1220 of FIG. 12) that can include load balancer (LB) subnet(s) 1422 (e.g., LB subnet(s) 1222 of FIG. 12), a control plane app tier 1424 (e.g., the control plane app tier 1224 of FIG. 12) that can include app subnet(s) 1426 (e.g., similar to app subnet(s) 1226 of FIG. 12), a control plane data tier 1428 (e.g., the control plane data tier 1228 of FIG. 12) that can include DB subnet(s) 1430. The LB subnet(s) 1422 contained in the control plane DMZ tier 1420 can be communicatively coupled to the app subnet(s) 1426 contained in the control plane app tier 1424 and to an Internet gateway 1434 (e.g., the Internet gateway 1234 of FIG. 12) that can be contained in the control plane VCN 1416, and the app subnet(s) 1426 can be communicatively coupled to the DB subnet(s) 1430 contained in the control plane data tier 1428 and to a service gateway 1436 (e.g., the service gateway of FIG. 12) and a network address translation (NAT) gateway 1438 (e.g., the NAT gateway 1238 of FIG. 12). The control plane VCN 1416 can include the service gateway 1436 and the NAT gateway 1438.

The data plane VCN 1418 can include a data plane app tier 1446 (e.g., the data plane app tier 1246 of FIG. 12), a data plane DMZ tier 1448 (e.g., the data plane DMZ tier

1248 of FIG. 12), and a data plane data tier 1450 (e.g., the data plane data tier 1250 of FIG. 12). The data plane DMZ tier 1448 can include LB subnet(s) 1422 that can be communicatively coupled to trusted app subnet(s) 1460 and untrusted app subnet(s) 1462 of the data plane app tier 1446 and the Internet gateway 1434 contained in the data plane VCN 1418. The trusted app subnet(s) 1460 can be communicatively coupled to the service gateway 1436 contained in the data plane VCN 1418, the NAT gateway 1438 contained in the data plane VCN 1418, and DB subnet(s) 1430 contained in the data plane data tier 1450. The untrusted app subnet(s) 1462 can be communicatively coupled to the service gateway 1436 contained in the data plane VCN 1418 and DB subnet(s) 1430 contained in the data plane data tier 1450. The data plane data tier 1450 can include DB subnet(s) 1430 that can be communicatively coupled to the service gateway 1436 contained in the data plane VCN 1418.

The untrusted app subnet(s) 1462 can include one or more primary VNICs 1464(1)-(N) that can be communicatively coupled to tenant virtual machines (VMs) 1466(1)-(N). Each tenant VM 1466(1)-(N) can be communicatively coupled to a respective app subnet 1467(1)-(N) that can be contained in respective container egress VCNs 1468(1)-(N) that can be contained in respective customer tenancies 1470(1)-(N). Respective secondary VNICs 1472(1)-(N) can facilitate communication between the untrusted app subnet(s) 1462 contained in the data plane VCN 1418 and the app subnet contained in the container egress VCNs 1468(1)-(N). Each container egress VCNs 1468(1)-(N) can include a NAT gateway 1438 that can be communicatively coupled to public Internet 1454 (e.g., public Internet 1254 of FIG. 12).

The Internet gateway 1434 contained in the control plane VCN 1416 and contained in the data plane VCN 1418 can be communicatively coupled to a metadata management service 1452 (e.g., the metadata management system 1252 of FIG. 12) that can be communicatively coupled to public Internet 1454. Public Internet 1454 can be communicatively coupled to the NAT gateway 1438 contained in the control plane VCN 1416 and contained in the data plane VCN 1418. The service gateway 1436 contained in the control plane VCN 1416 and contained in the data plane VCN 1418 can be communicatively couple to cloud services 1456.

In some embodiments, the data plane VCN 1418 can be integrated with customer tenancies 1470. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1446. Code to run the function may be executed in the VMs 1466(1)-(N), and the code may not be configured to run anywhere else on the data plane VCN 1418. Each VM 1466(1)-(N) may be connected to one customer tenancy 1470. Respective containers 1471(1)-(N) contained in the VMs 1466(1)-(N) may be configured to run the code. In this case, there can be a dual isolation (e.g., the containers 1471(1)-(N) running code, where the containers 1471(1)-(N) may be contained in at least the VM 1466(1)-(N) that are contained in the untrusted app subnet(s) 1462), which may help prevent incorrect or otherwise undesirable code from damaging the network of the IaaS provider or from damaging a network of a different customer. The containers 1471 (1)-(N) may be communicatively coupled to the customer tenancy 1470 and may be configured to transmit or receive data from the customer tenancy 1470. The containers 1471 (1)-(N) may not be configured to transmit or receive data from any other entity in the data plane VCN 1418. Upon completion of running the code, the IaaS provider may kill or otherwise dispose of the containers 1471(1)-(N).

In some embodiments, the trusted app subnet(s) 1460 may run code that may be owned or operated by the IaaS provider. In this embodiment, the trusted app subnet(s) 1460 may be communicatively coupled to the DB subnet(s) 1430 and be configured to execute CRUD operations in the DB subnet(s) 1430. The untrusted app subnet(s) 1462 may be communicatively coupled to the DB subnet(s) 1430, but in this embodiment, the untrusted app subnet(s) may be configured to execute read operations in the DB subnet(s) 1430. The containers 1471(1)-(N) that can be contained in the VM 1466(1)-(N) of each customer and that may run code from the customer may not be communicatively coupled with the DB subnet(s) 1430.

In other embodiments, the control plane VCN 1416 and the data plane VCN 1418 may not be directly communicatively coupled. In this embodiment, there may be no direct communication between the control plane VCN 1416 and the data plane VCN 1418. However, communication can occur indirectly through at least one method. An LPG 1410 may be established by the IaaS provider that can facilitate communication between the control plane VCN 1416 and the data plane VCN 1418. In another example, the control plane VCN 1416 or the data plane VCN 1418 can make a call to cloud services 1456 via the service gateway 1436. For example, a call to cloud services 1456 from the control plane VCN 1416 can include a request for a service that can communicate with the data plane VCN 1418.

Figure 15:
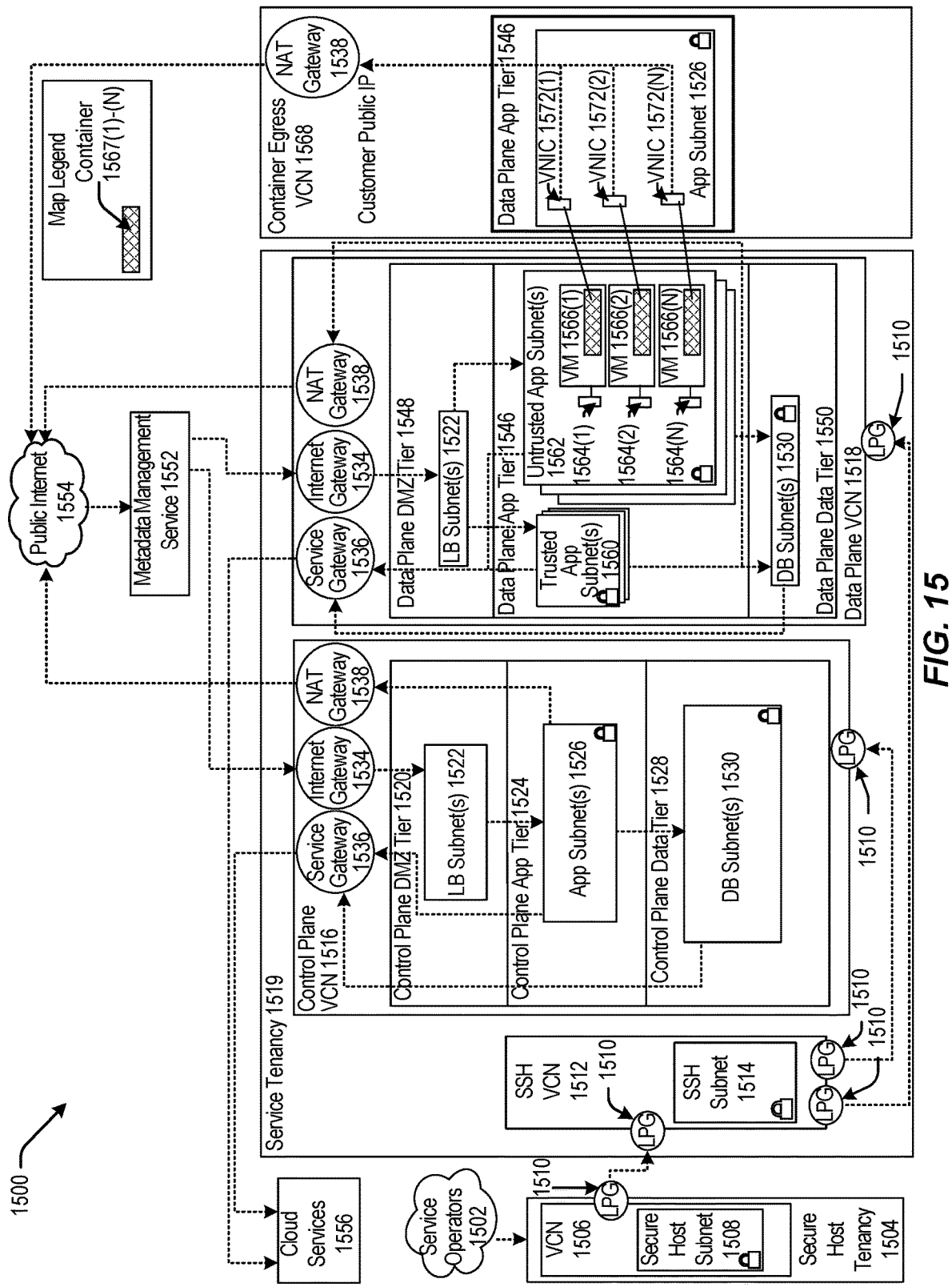
FIG. 15 is a block diagram illustrating another pattern for implementing a cloud infrastructure as a service system, according to at least one embodiment.

FIG. 15 is a block diagram 1500 illustrating another example pattern of an IaaS architecture, according to at least one embodiment. Service operators 1502 (e.g., service operators 1202 of FIG. 12) can be communicatively coupled to a secure host tenancy 1504 (e.g., the secure host tenancy 1204 of FIG. 12) that can include a virtual cloud network (VCN) 1506 (e.g., the VCN 1206 of FIG. 12) and a secure host subnet 1508 (e.g., the secure host subnet 1208 of FIG. 12). The VCN 1506 can include an LPG 1510 (e.g., the LPG 1210 of FIG. 12) that can be communicatively coupled to an SSH VCN 1512 (e.g., the SSH VCN 1212 of FIG. 12) via an LPG 1510 contained in the SSH VCN 1512. The SSH VCN 1512 can include an SSH subnet 1514 (e.g., the SSH subnet 1214 of FIG. 12), and the SSH VCN 1512 can be communicatively coupled to a control plane VCN 1516 (e.g., the control plane VCN 1216 of FIG. 12) via an LPG 1510 contained in the control plane VCN 1516 and to a data plane VCN 1518 (e.g., the data plane 1218 of FIG. 12) via an LPG 1510 contained in the data plane VCN 1518. The control plane VCN 1516 and the data plane VCN 1518 can be contained in a service tenancy 1519 (e.g., the service tenancy 1219 of FIG. 12).

The control plane VCN 1516 can include a control plane DMZ tier 1520 (e.g., the control plane DMZ tier 1220 of FIG. 12) that can include LB subnet(s) 1522 (e.g., LB subnet(s) 1222 of FIG. 12), a control plane app tier 1524 (e.g., the control plane app tier 1224 of FIG. 12) that can include app subnet(s) 1526 (e.g., app subnet(s) 1226 of FIG. 12), a control plane data tier 1528 (e.g., the control plane data tier 1228 of FIG. 12) that can include DB subnet(s) 1530 (e.g., DB subnet(s) 1430 of FIG. 14). The LB subnet(s) 1522 contained in the control plane DMZ tier 1520 can be communicatively coupled to the app subnet(s) 1526 contained in the control plane app tier 1524 and to an Internet gateway 1534 (e.g., the Internet gateway 1234 of FIG. 12) that can be contained in the control plane VCN 1516, and the app subnet(s) 1526 can be communicatively coupled to the DB subnet(s) 1530 contained in the control plane data tier 1528 and to a service gateway 1536 (e.g., the service gateway of FIG. 12) and a network address translation (NAT) gateway 1538 (e.g., the NAT gateway 1238 of FIG. 12). The control plane VCN 1516 can include the service gateway 1536 and the NAT gateway 1538.

The data plane VCN 1518 can include a data plane app tier 1546 (e.g., the data plane app tier 1246 of FIG. 12), a data plane DMZ tier 1548 (e.g., the data plane DMZ tier 1248 of FIG. 12), and a data plane data tier 1550 (e.g., the data plane data tier 1250 of FIG. 12). The data plane DMZ tier 1548 can include LB subnet(s) 1522 that can be communicatively coupled to trusted app subnet(s) 1560 (e.g., trusted app subnet(s) 1460 of FIG. 14) and untrusted app subnet(s) 1562 (e.g., untrusted app subnet(s) 1462 of FIG. 14) of the data plane app tier 1546 and the Internet gateway 1534 contained in the data plane VCN 1518. The trusted app subnet(s) 1560 can be communicatively coupled to the service gateway 1536 contained in the data plane VCN 1518, the NAT gateway 1538 contained in the data plane VCN 1518, and DB subnet(s) 1530 contained in the data plane data tier 1550. The untrusted app subnet(s) 1562 can be communicatively coupled to the service gateway 1536 contained in the data plane VCN 1518 and DB subnet(s) 1530 contained in the data plane data tier 1550. The data plane data tier 1550 can include DB subnet(s) 1530 that can be communicatively coupled to the service gateway 1536 contained in the data plane VCN 1518.

The untrusted app subnet(s) 1562 can include primary VNICs 1564(1)-(N) that can be communicatively coupled to tenant virtual machines (VMs) 1566(1)-(N) residing within the untrusted app subnet(s) 1562. Each tenant VM 1566(1)-(N) can run code in a respective container 1567(1)-(N), and be communicatively coupled to an app subnet 1526 that can be contained in a data plane app tier 1546 that can be contained in a container egress VCN 1568. Respective secondary VNICs 1572(1)-(N) can facilitate communication between the untrusted app subnet(s) 1562 contained in the data plane VCN 1518 and the app subnet contained in the container egress VCN 1568. The container egress VCN can include a NAT gateway 1538 that can be communicatively coupled to public Internet 1554 (e.g., public Internet 1254 of FIG. 12).

The Internet gateway 1534 contained in the control plane VCN 1516 and contained in the data plane VCN 1518 can be communicatively coupled to a metadata management service 1552 (e.g., the metadata management system 1252 of FIG. 12) that can be communicatively coupled to public Internet 1554. Public Internet 1554 can be communicatively coupled to the NAT gateway 1538 contained in the control plane VCN 1516 and contained in the data plane VCN 1518. The service gateway 1536 contained in the control plane VCN 1516 and contained in the data plane VCN 1518 can be communicatively couple to cloud services 1556.

In some examples, the pattern illustrated by the architecture of block diagram 1500 of FIG. 15 may be considered an exception to the pattern illustrated by the architecture of block diagram 1400 of FIG. 14 and may be desirable for a customer of the IaaS provider if the IaaS provider cannot directly communicate with the customer (e.g., a disconnected region). The respective containers 1567(1)-(N) that are contained in the VMs 1566(1)-(N) for each customer can be accessed in real-time by the customer. The containers 1567(1)-(N) may be configured to make calls to respective secondary VNICs 1572(1)-(N) contained in app subnet(s) 1526 of the data plane app tier 1546 that can be contained in the container egress VCN 1568. The secondary VNICs 1572(1)-(N) can transmit the calls to the NAT gateway 1538 that may transmit the calls to public Internet 1554. In this example, the containers 1567(1)-(N) that can be accessed in real-time by the customer can be isolated from the control plane VCN 1516 and can be isolated from other entities contained in the data plane VCN 1518. The containers 1567(1)-(N) may also be isolated from resources from other customers.

In other examples, the customer can use the containers 1567(1)-(N) to call cloud services 1556. In this example, the customer may run code in the containers 1567(1)-(N) that requests a service from cloud services 1556. The containers 1567(1)-(N) can transmit this request to the secondary VNICs 1572(1)-(N) that can transmit the request to the NAT gateway that can transmit the request to public Internet 1554. Public Internet 1554 can transmit the request to LB subnet(s) 1522 contained in the control plane VCN 1516 via the Internet gateway 1534. In response to determining the request is valid, the LB subnet(s) can transmit the request to app subnet(s) 1526 that can transmit the request to cloud services 1556 via the service gateway 1536.

It should be appreciated that IaaS architectures 1200, 1300, 1400, 1500 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 16:
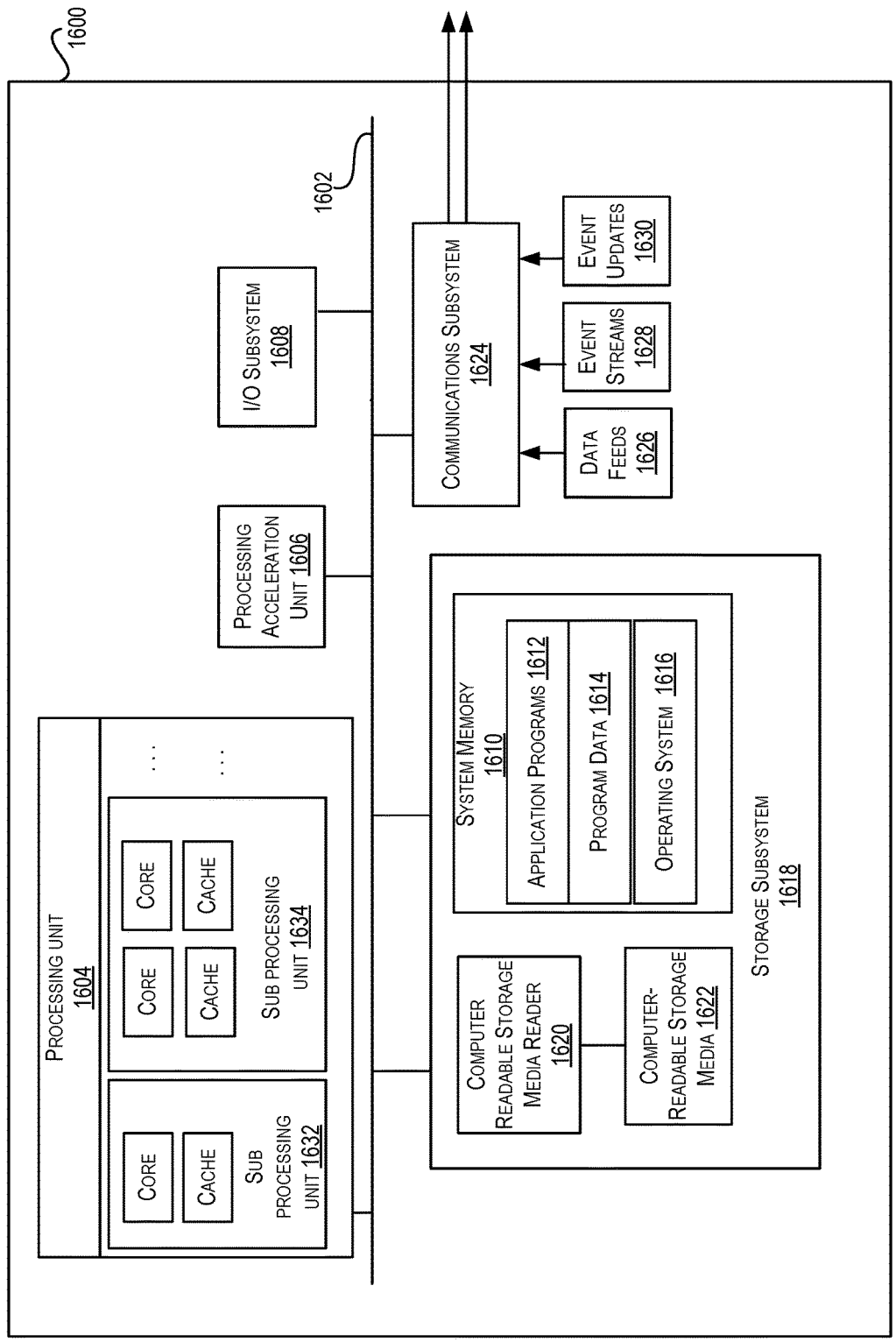
FIG. 16 is a block diagram illustrating an example computer system, according to at least one embodiment.

FIG. 16 illustrates an example computer system 1600, in which various embodiments may be implemented. The system 1600 may be used to implement any of the computer systems described above. As shown in the figure, computer system 1600 includes a processing unit 1604 that communicates with a number of peripheral subsystems via a bus subsystem 1602. These peripheral subsystems may include a processing acceleration unit 1606, an I/O subsystem 1608, a storage subsystem 1618 and a communications subsystem 1624. Storage subsystem 1618 includes tangible computer-readable storage media 1622 and a system memory 1610.

Bus subsystem 1602 provides a mechanism for letting the various components and subsystems of computer system 1600 communicate with each other as intended. Although bus subsystem 1602 is shown schematically as a single bus, alternative embodiments of the bus subsystem may utilize multiple buses. Bus subsystem 1602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1604, which can be implemented as one or more integrated circuits (e.g., a conventional microprocessor or microcontroller), controls the operation of computer system 1600. One or more processors may be included in processing unit 1604. These processors may include single core or multicore processors. In certain embodiments, processing unit 1604 may be implemented as one or more independent processing units 1632 and/or 1634 with single or multicore processors included in each processing unit. In other embodiments, processing unit 1604 may also be implemented as a quad-core processing unit formed by integrating two dual-core processors into a single chip.

In various embodiments, processing unit 1604 can execute a variety of programs in response to program code and can maintain multiple concurrently executing programs or processes. At any given time, some or all of the program code to be executed can be resident in processor(s) 1604 and/or in storage subsystem 1618. Through suitable programming, processor(s) 1604 can provide various functionalities described above. Computer system 1600 may additionally include a processing acceleration unit 1606, which can include a digital signal processor (DSP), a special-purpose processor, and/or the like.

I/O subsystem 1608 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1600 may comprise a storage subsystem 1618 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1604 provide the functionality described above. Storage subsystem 1618 may also provide a repository for storing data used in accordance with the present disclosure.

As depicted in the example in FIG. 16, storage subsystem 1618 can include various components including a system memory 1610, computer-readable storage media 1622, and a computer readable storage media reader 1620. System memory 1610 may store program instructions that are loadable and executable by processing unit 1604. System memory 1610 may also store data that is used during the execution of the instructions and/or data that is generated during the execution of the program instructions. Various different kinds of programs may be loaded into system memory 1610 including but not limited to client applications, Web browsers, mid-tier applications, relational database management systems (RDBMS), virtual machines, containers, etc.

System memory 1610 may also store an operating system 1616. Examples of operating system 1616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1600 executes one or more virtual machines, the virtual machines along with their guest operating systems (GOSs) may be loaded into system memory 1610 and executed by one or more processors or cores of processing unit 1604.

System memory 1610 can come in different configurations depending upon the type of computer system 1600. For example, system memory 1610 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1610 may include a basic input/output system (BIOS) containing basic routines that help to transfer information between elements within computer system 1600, such as during start-up.

Computer-readable storage media 1622 may represent remote, local, fixed, and/or removable storage devices plus storage media for temporarily and/or more permanently containing, storing, computer-readable information for use by computer system 1600 including instructions executable by processing unit 1604 of computer system 1600.

Computer-readable storage media 1622 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1622 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1622 may include, but is not limited to, Zip® drives, flash memory cards, universal serial bus (USB) flash drives, secure digital (SD) cards, DVD disks, digital video tape, and the like. Computer-readable storage media 1622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1600.

Machine-readable instructions executable by one or more processors or cores of processing unit 1604 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1624 provides an interface to other computer systems and networks. Communications subsystem 1624 serves as an interface for receiving data from and transmitting data to other systems from computer system 1600. For example, communications subsystem 1624 may enable computer system 1600 to connect to one or more devices via the Internet. In some embodiments communications subsystem 1624 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1624 can provide wired network connectivity (e.g., Ethernet) in addition to or instead of a wireless interface.

In some embodiments, communications subsystem 1624 may also receive input communication in the form of structured and/or unstructured data feeds 1626, event streams 1628, event updates 1630, and the like on behalf of one or more users who may use computer system 1600.

By way of example, communications subsystem 1624 may be configured to receive data feeds 1626 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1624 may also be configured to receive data in the form of continuous data streams, which may include event streams 1628 of real-time events and/or event updates 1630, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1624 may also be configured to output the structured and/or unstructured data feeds 1626, event streams 1628, event updates 1630, and the like to one or more databases that may be in communication with one or more streaming data source computers coupled to computer system 1600.

Computer system 1600 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1600 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
   accessing, by a computing device, a target code for implementing an application;
   identifying, by the computing device, a plurality of respective addresses for one or more functions associated with the target code or one or more variables associated with the target code;
   generating, by the computing device, an interval tree comprising a root node and one or more function nodes corresponding to at least one of a function or one or more variables; and
   in response to the target code invoking at least one of the one or more functions or the one or more variables:
      generating, by the computing device, an intercept function, the intercept function being configured to intercept communication between the target code and a call address, the call address being a particular address, of the plurality of respective addresses, for the at least one of the one or more functions or the one or more variables invoked by the target code;
      intercepting, by the computing device, data communicated between the target code and the call address;
      storing, by the computing device, the intercepted data as a function node in the interval tree; and
      transmitting, by the computing device, the interval tree to a user device.

2. The method of claim 1, wherein the intercepted data comprises program runtime information.

3. The method of claim 1, wherein the application is either a monolithic application or a distributed system application.

4. The method of claim 3, wherein the interval tree further comprises one or more service nodes, a service node corresponding to a service in the distributed system.

5. The method of claim 4, wherein the interval tree further comprises one or more subtrees, a subtree comprising a service node and one or more function nodes.

6. The method of claim 1, wherein the intercept function is defined by a user at the user device.

7. The method of claim 1, wherein the target code is a Python code.

8. A non-transitory computer-readable medium storing a set of instructions, the set of instructions comprising:
   one or more instructions that, when executed by one or more processors of a computing device, cause the computing device to:
      access a target code for implementing an application;
      identify a plurality of respective addresses for one or more functions associated with the target code or one or more variables associated with the target code;

generate an interval tree comprising a root node and one or more function nodes corresponding to at least one of a function or one or more variables; and in response to the target code invoking at least one of the one or more functions or the one or more variables:

generate an intercept function, the intercept function being configured to intercept communication between the target code and a call address, the call address being a particular address, of the plurality of respective addresses, for the at least one of the one or more functions or the one or more variables invoked by the target code;

intercept data communicated between the target code and the call address;

store the intercepted data as a function node in the interval tree; and transmit the interval tree to a user device.

9. The non-transitory computer-readable medium of claim 8, wherein the intercepted data comprises program runtime information.

10. The non-transitory computer-readable medium of claim 8, wherein the application is either a monolithic application or a distributed system application.

11. The non-transitory computer-readable medium of claim 10, wherein the interval tree further comprises one or more service nodes, a service node corresponding to a service in the distributed system.

12. The non-transitory computer-readable medium of claim 11, wherein the interval tree further comprises one or more subtrees, a subtree comprising a service node and one or more function nodes.

13. The non-transitory computer-readable medium of claim 8, wherein the intercept function is defined by a user at the user device.

14. The non-transitory computer-readable medium of claim 8, wherein the target code is a Python code.

15. A computing device, comprising:
one or more memories; and
one or more processors, communicatively coupled to the one or more memories, configured to:
access a target code for implementing an application;
identify a plurality of respective addresses for one or more functions associated with the target code or one or more variables associated with the target code;
generate an interval tree comprising a root node and one or more function nodes corresponding to at least one of a function or one or more variables; and
in response to the target code invoking at least one of the one or more functions or the one or more variables:

generate an intercept function, the intercept function being configured to intercept communication between the target code and a call address, the call address being a particular address, of the plurality of respective addresses, for the at least one of the one or more functions or the one or more variables invoked by the target code;

intercept data communicated between the target code and the call address;

store the intercepted data as a function node in the interval tree; and transmit the interval tree to a user device.

16. The computing device of claim 15, wherein the intercepted data comprises program runtime information.

17. The computing device of claim 15, wherein the application is either a monolithic application or a distributed system application.

18. The computing device of claim 17, wherein the interval tree further comprises one or more service nodes, a service node corresponding to a service in the distributed system.

19. The computing device of claim 18, wherein the interval tree further comprises one or more subtrees, a subtree comprising a service node and one or more function nodes.

20. The computing device of claim 15, wherein the intercept function is defined by a user at the user device.

* * * * *